(12) United States Patent
Terashita et al.

(10) Patent No.: US 7,580,101 B2
(45) Date of Patent: Aug. 25, 2009

(54) LIQUID CRYSTAL DISPLAY DEVICE HAVING 4-DIVIDED DOMAINS

(75) Inventors: Shinichi Terashita, Kyoto (JP); Masami Kido, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 596 days.

(21) Appl. No.: 11/030,284

(22) Filed: Jan. 7, 2005

(65) Prior Publication Data

US 2005/0117100 A1 Jun. 2, 2005

Related U.S. Application Data

(62) Division of application No. 10/084,363, filed on Feb. 28, 2002, now Pat. No. 6,856,368.

(30) Foreign Application Priority Data

Mar. 21, 2001 (JP) ............................. 2001-080193

(51) Int. Cl.
*G02F 1/1337* (2006.01)

(52) U.S. Cl. ...................... 349/129; 349/123; 349/127; 349/128; 349/130

(58) Field of Classification Search ................. 349/123, 349/127–130
See application file for complete search history.

(56) References Cited

U.S. PATENT DOCUMENTS 5,377,028 A 12/1994 Yoshida et al. ................ 359/53

(Continued)

FOREIGN PATENT DOCUMENTS

JP 7-36043 2/1995

(Continued)

OTHER PUBLICATIONS

Naoki Kato, et al; "Four-Domain TN-LCD Using New Division Pattern and Special Arrangement", IDW'97, pp. 163-166, 1997.

(Continued)

*Primary Examiner*—Andrew Schechter
*Assistant Examiner*—George Y. Wang
(74) *Attorney, Agent, or Firm*—Nixon & Vanderhye P.C.

(57) ABSTRACT

A picture element includes a 4-divided domain including first, second, third and fourth sub-domains which are arranged in this order in a predetermined direction and in each of which an orientation direction of liquid crystal molecules located in the vicinity of the center of a liquid crystal layer in the thickness direction is different from those of the other sub-domains. A first substrate includes two first regions having an orientation-regulating force for orienting the liquid crystal molecules in a first direction and a second region provided between the two first regions and having an orientation-regulating force for orienting the liquid crystal molecules in a second direction that is opposite to the first direction. A second substrate includes a third region having an orientation-regulating force for orienting the liquid crystal molecules in a third direction that crosses the first direction and a fourth region having an orientation-regulating force for orienting the liquid crystal molecules in a fourth direction that is opposite to the third direction. The first sub-domain is formed between one of the two first regions and the third region, the second sub-domain is formed between the second region and the third region, the third sub-domain is formed between the second region and the fourth region, and the fourth sub-domain is formed between the other one of the two first regions and the fourth region.

3 Claims, 16 Drawing Sheets

U.S. PATENT DOCUMENTS 5,579,141 A  11/1996  Suzuki et al. .................. 359/75
6,288,762 B1  9/2001  Susaki et al. ................ 349/129

FOREIGN PATENT DOCUMENTS

| JP | 9-297307 | 11/1997 |
| JP | 10-020313 | 1/1998 |
| JP | 10-301113 | 11/1998 |
| JP | 11-007021 | 1/1999 |
| JP | 11-352486 | 12/1999 |

OTHER PUBLICATIONS

Japanese Office Action mailed Oct. 18, 2005 (w/English translation thereof).

LIQUID CRYSTAL DISPLAY DEVICE HAVING 4-DIVIDED DOMAINS

This application is a Divisional of application Ser. No. 10/084,363 filed Feb. 28, 2002, now U.S. Pat. No. 6,856,368 the entire content of which is hereby incorporated herein by reference in this application.

BACKGROUND OF THE INVENTION

1. Field of the Invention

The present invention relates to a liquid crystal display device and a method for producing the same, and more particularly to a liquid crystal display device having a wide viewing angle characteristic and a method for producing the same.

2. Description of the Background Art

Liquid crystal display devices of various display modes have been widely used in the art, including a TN mode and an STN mode in which an image is displayed by untying a twist alignment of liquid crystal molecules by applying a voltage across a liquid crystal layer, and an ECB mode in which an image is displayed by utilizing changes in birefringence due to changes in orientation of the liquid crystal layer that are caused by a voltage application. However, liquid crystal display devices of these display modes have a poor viewing angle characteristic.

As liquid crystal display devices become more widespread, there are more stringent characteristics requirements. For example, there has been a demand for liquid crystal display devices having wide viewing angle characteristics suitable for use in personal digital assistants, personal computers, word processors, amusement equipment, educational equipment, television sets, etc., that are viewed by a number of viewers.

Known methods for improving the viewing angle characteristic of a liquid crystal display device include a so-called "pixel division method" (also called "multi-domain method").

For example, Kato, et. al., have proposed a TN-alignment 4-division method using a nematic (Np) liquid crystal material having a positive dielectric anisotropy and a horizontal alignment film in IDW'97, p.163–p.166, "Four-Domain TN-LCD Using New Division Pattern and Special Arrangement". It is stated that with the 4-division method of this article, there is no disclination line occurring between domains, which has been a problem with TN-alignment pixel division methods. However, in a normally white mode (NW mode) TN type liquid crystal display device, typically, light leakage is likely to occur in a black display, and it is difficult to realize a display with a high contrast ratio. This is due to liquid crystal molecules in the vicinity of an alignment film (sometimes called an "anchoring layer") maintaining a horizontal alignment even in the presence of an applied voltage. Therefore, with the 4-division TN type liquid crystal display device disclosed in the above article, as with other TN type liquid crystal display devices, it is difficult to realize a high-quality display that is currently demanded.

Japanese Laid-Open Patent Publication No. 10-301113 describes improving the viewing angle characteristic and the response characteristic of a liquid crystal display device of a vertical alignment type by forming a minute domain in a boundary region between two domains in which liquid crystal molecules are inclined in respective directions differing from each other by 180° so that the liquid crystal molecules in the minute domain are inclined in a direction that is perpendicular to both of the respective directions in which the liquid crystal molecules are inclined in the two domains. Since the liquid crystal display device is of a vertical alignment type, the quality of a black display is not lowered as in a TN type liquid crystal display device.

However, the present inventors have found that with the vertical alignment type liquid crystal display device disclosed in this publication, a disclination line occurs between domains as a voltage is turned ON/OFF. As a result, a display non-uniformity is observed in all azimuth angle directions particularly when the display surface is observed from an inclined direction. If the disclination line occurs to a considerable degree, the display quality is dependent on the viewing angle.

SUMMARY OF THE INVENTION

The present invention has been made in view of the problems described above, and has an object to provide a liquid crystal display device with a desirable viewing angle characteristic that is capable of displaying an image with a high quality, and a method for producing the same.

A liquid crystal display device of the present invention includes: a first substrate; a second substrate; a vertical alignment type liquid crystal layer provided between the first substrate and the second substrate; voltage application means for applying a voltage across the liquid crystal layer; a plurality of picture elements each including the liquid crystal layer whose orientation changes according to the voltage applied by the voltage application means, wherein: the liquid crystal layer in each of the plurality of picture elements includes, at least in a presence of an applied voltage, a 4-divided domain including a first sub-domain, a second sub-domain, a third sub-domain and a fourth sub-domain which are arranged in this order in a predetermined direction and in each of which an orientation direction of liquid crystal molecules located in a vicinity of a center of the liquid crystal layer in the thickness direction is different from those of the other sub-domains; for each 4-divided domain, the first substrate includes two first regions each having an orientation-regulating force for orienting the liquid crystal molecules of the liquid crystal layer in a first direction and a second region provided between the two first regions and having an orientation-regulating force for orienting the liquid crystal molecules in a second direction that is opposite to the first direction, while the second substrate includes a third region having an orientation-regulating force for orienting the liquid crystal molecules in a third direction that crosses the first direction and a fourth region having an orientation-regulating force for orienting the liquid crystal molecules in a fourth direction that is opposite to the third direction; and the first sub-domain is formed between one of the two first regions and the third region, the second sub-domain is formed between the second region and the third region, the third sub-domain is formed between the second region and the fourth region, and the fourth sub-domain is formed between the other one of the two first regions and the fourth region. Thus, the above object is achieved.

It is preferred that the first direction and the third direction are perpendicular to each other.

The liquid crystal layer in each of the plurality of picture elements may include, at least in a presence of an applied voltage, the 4-divided domain and an additional first sub-domain that is adjacent to the fourth sub-domain included in the 4-divided domain. In such a case, it is preferred that a total area of the first sub-domain and the additional first sub-domain, an area of the second sub-domain, an area of the third sub-domain and an area of the fourth sub-domain are equal to one another for the liquid crystal layer in each of the plurality of picture elements. It is preferred that at least the total area of the first region and the additional first region is equal to the area of the third region, and the area of the second region is equal to the area of the fourth region.

The liquid crystal layer in each of the plurality of picture elements may be substantially occupied by one 4-divided domain at least in a presence of an applied voltage. In such a case, it is preferred that respective areas of the first, second, third and fourth sub-domains are substantially equal to one another.

It is preferred that a relationship x=y/n (n is a positive integer equal to or greater than 1) is satisfied, where x is a length of the second sub-domain in the predetermined direction and y is a length of each of the second region and the fourth region in the predetermined direction.

It is more preferred that a relationship P=4nx=2ny (n is a positive integer equal to or greater than 1) is satisfied, where P is a length of each of the plurality of picture elements in the predetermined direction, x is a length of the second sub-domain in the predetermined direction, and y is a length of each of the second region and the fourth region in the predetermined direction.

In one embodiment, the plurality of picture elements are arranged in a matrix having rows and columns, and the predetermined direction is parallel to the columns. In such a case, the two first regions, the second region, the third region and the fourth region may be formed parallel to the rows in a stripe pattern so as to lie on a row of picture elements among the plurality of picture elements. It is preferred that a length of the second region in the column direction and a length of the fourth region in the column direction are equal to each other. Moreover, it is preferred that a length of each of the first, second, third and fourth sub-domains in the column direction is one half of the length of the second region in the column direction.

It is preferred that a liquid crystal display device of the present invention produces a display in a normally black mode. In such a case, it is preferred that the liquid crystal display device further includes a pair of polarizers arranged so as to oppose each other via the first and second substrates therebetween, and a phase difference compensator provided between the first substrate and one of the pair of polarizers corresponding to the first substrate and/or between the second substrate and the other one of the pair of polarizers corresponding to the second substrate, wherein a slow axis of the phase difference compensator is in a plane of the liquid crystal layer and is perpendicular to an absorption axis of closer one of the pair of polarizers.

The liquid crystal display device as described above is produced preferably by a production method including the steps of: injecting a liquid crystal material into a gap between the first substrate and the second substrate; and after the injection step, holding the liquid crystal material at a temperature equal to or greater than a Tni point of the liquid crystal material for a predetermined amount of time or longer and then cooling the liquid crystal material to normal temperature.

DETAILED DESCRIPTION OF THE PREFERRED EMBODIMENTS

Figure 1:
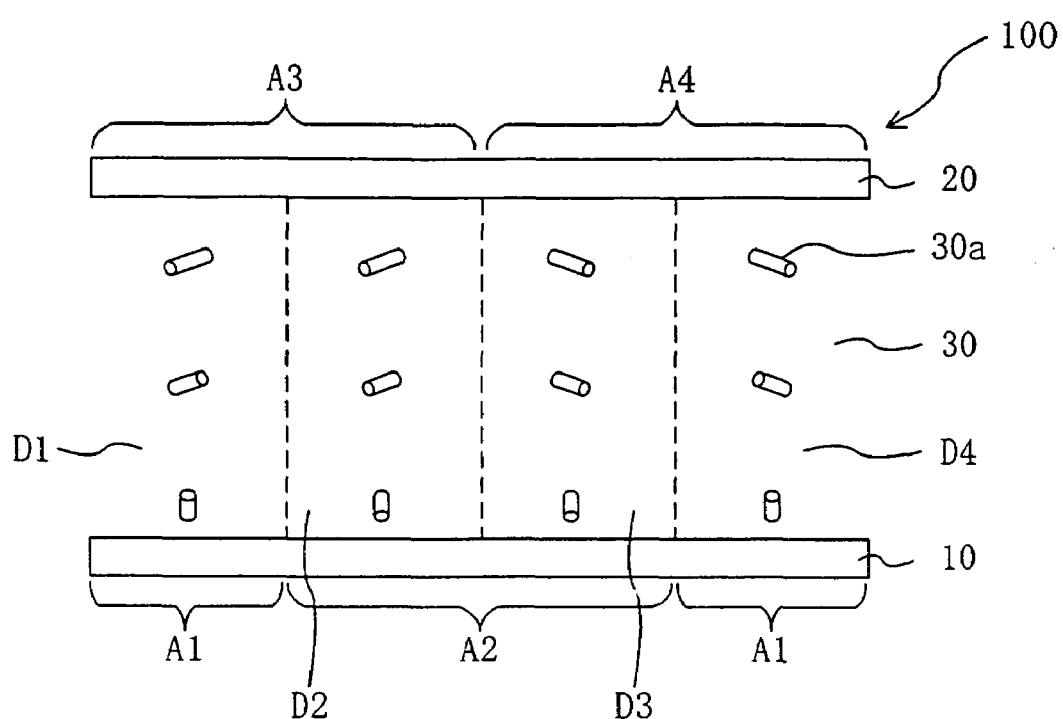
FIG. 1 is a cross-sectional view schematically illustrating a liquid crystal display device 100 according to an embodiment of the present invention.

First, an arrangement of a liquid crystal display device 100 according to an embodiment of the present invention will be described with reference to FIG. 1, which schematically illustrates one picture element of the liquid crystal display device 100.

Herein, a region of a liquid crystal cell corresponding to a "picture element", which is the minimum unit of display, will also be referred to as a "picture element" for the sake of simplicity. For example, each picture element is defined by a picture element electrode and a counter electrode opposing the picture element electrode in an active matrix type liquid crystal display device (e.g., a TFT type liquid crystal display device), and by an intersection between one of column electrodes (signal electrodes) and one of row electrodes (scanning electrodes), which are both arranged in a stripe pattern, in a passive matrix type liquid crystal display device. In a plasma addressed liquid crystal display device, each picture element is defined by an intersection between a virtual electrode and an opposing column electrode, the virtual electrode being defined by a plasma channel. Picture elements are typically arranged in a matrix having rows and columns to form a display area.

The liquid crystal display device 100 includes a first substrate (e.g., a TFT substrate) 10, a second substrate (e.g., a color filter substrate) 20, and a vertical alignment type liquid crystal layer 30 provided between the first substrate 10 and the second substrate 20. Voltage application means (not shown) for applying a voltage across the liquid crystal layer 30 is provided between the first substrate 10 and the second substrate 20. Herein, a component with which a voltage for a display operation is applied across a liquid crystal layer is referred to as "voltage application means", and the term "voltage application means" includes not only an electrode pair used in an active matrix type liquid crystal display device and a passive matrix type liquid crystal display device, but also a combination of a virtual electrode and a column electrode in a plasma addressed liquid crystal display device.

Typically, the vertical alignment type liquid crystal layer 30 is obtained by controlling the alignment of a nematic liquid crystal material having a negative dielectric anisotropy with a vertical alignment film (not shown) provided on one side of each of the first substrate 10 and the second substrate 20 that is closer to the liquid crystal layer 30. In the absence of an applied voltage, liquid crystal molecules 30a of the vertical alignment type liquid crystal layer 30 are aligned substantially vertical (at about 87° or more) to the surface of each vertical alignment film (the surface of each of the first substrate 10 and the second substrate 20). When a voltage for generating an electric field in a direction vertical to the plane of the liquid crystal layer 30 is applied, a force that urges the liquid crystal molecules 30a to the direction perpendicular to the direction of the electric field acts on the liquid crystal molecules 30a, thereby inclining the liquid crystal molecules 30a. The direction in which the liquid crystal molecules 30a are inclined is determined by an orientation-regulating force on the surface of each of the first substrate 10 and the second substrate 20. In FIG. 1, the liquid crystal molecules 30a are represented by cylinders each having a top or bottom surface drawn in the figure, which indicates that the end of the top or bottom surface is facing toward the viewer of the drawing sheet. FIG. 1 schematically illustrates a state where a voltage for displaying an intermediate gray level is applied across the liquid crystal layer 30.

The liquid crystal layer in each picture element of the liquid crystal display device 100 of the present invention includes, at least in the presence of an applied voltage, a 4-divided domain D including a first sub-domain D1, a second sub-domain D2, a third sub-domain D3 and a fourth sub-domain D4 that are arranged in this order in a predetermined direction (e.g., in the column direction). In the sub-domains D1 to D4, the liquid crystal molecules located in the vicinity of the center of the liquid crystal layer 30 in the thickness direction are aligned in respective directions differing from one another. Typically, each picture element has a rectangular shape that has a long side extending in the column direction (vertical direction) and a short side extending in the row direction (horizontal direction), and the length ratio therebetween is about 3:1 in a color display device. Thus, red (R), green (G) and blue (B) columns are arranged next to one another to form pixels (color display pixels) having an aspect ratio of about 1:1. Of course, the present invention is not limited to liquid crystal display devices of such a picture element arrangement, and the effects of the present invention can be obtained with liquid crystal display devices of any of various picture element arrangements. Moreover, the division direction is not limited to that of the example above. Nevertheless, examples where a picture element elongated in the column direction is divided in the column direction will be described below for the sake of simplicity.

In the liquid crystal display device of the present invention, each picture element is divided into a plurality of sub-domains (including a 4-divided domain) only in a predetermined direction (the column direction in the illustrated example), and not in any other direction. Moreover, while FIG. 1 illustrates an example where each picture element is occupied by a single 4-divided domain D, the present invention is not limited thereto. Alternatively, each picture element may further include additional sub-domain(s), or may include two or more 4-divided domains.

An arrangement of a 4-divided domain D that is formed in the presence of an applied voltage will be described below with reference to FIG. 1, along with FIG. 2A, FIG. 2B and FIG. 2C.

Each arrow in FIG. 2A indicates the orientation direction of the liquid crystal molecules 30a on the first substrate 10, each arrow in FIG. 2B indicates the orientation direction of the liquid crystal molecules 30a on the second substrate 20, and each arrow in FIG. 2C indicates the orientation direction of the liquid crystal molecules 30a in the vicinity of the center of the liquid crystal layer 30 in the thickness direction (hereinafter referred to as the "reference orientation direction" for the sake of simplicity) The reference orientation direction of a domain determines the viewing angle dependence of the domain. Each of the arrows illustrated in FIG. 2A, FIG. 2B and FIG. 2C indicates an orientation direction (azimuth angle direction) as viewed from the second substrate 20 side in the normal direction.

The first substrate 10 includes two first regions A1 having a regulating force for orienting the liquid crystal molecules 30a in a first direction R1, and a second region A2 provided between the two first regions A1 and having a regulating force for orienting the liquid crystal molecules 30a in a second direction R2 opposite to the first direction R1. The second substrate 20 includes a third region A3 having a regulating force for orienting the liquid crystal molecules 30a in a third direction R3 crossing the first direction R1, and a fourth region A4 having a regulating force for orienting the liquid crystal molecules 30a in a fourth direction R4 opposite to the third direction R3.

These regions A1 to A4 having the respective orientation-regulating forces (referred to also as "orientation-regulating regions") can be formed by, for example, rubbing each vertical alignment film. The first direction R1 and the second direction R2 are parallel to the row direction, and the third direction R3 and the fourth direction R4 are parallel to the column direction. Specifically, the orientation-regulating regions A1 to A4 can be formed by rubbing the first substrate 10 in two directions (antiparallel to each other) and rubbing the second substrate 20 in two directions (antiparallel to each other).

Figure 2A:
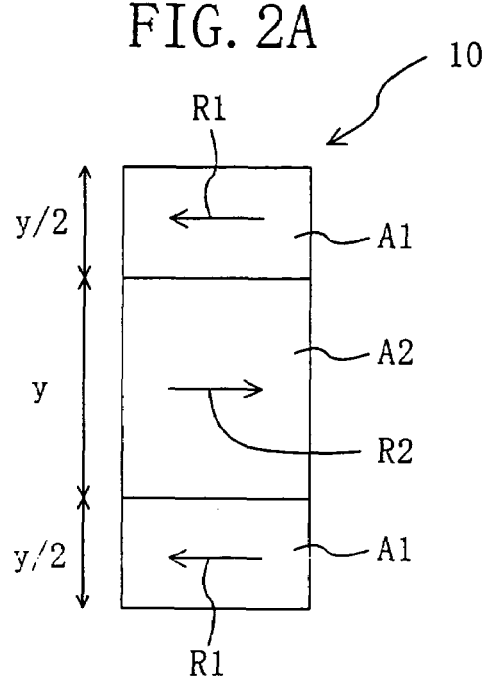
FIG. 2A, FIG. 2B and FIG. 2C are schematic diagrams illustrating a structure of a 4-divided domain D formed in each picture element of the liquid crystal display device 100.
Figure 2B:
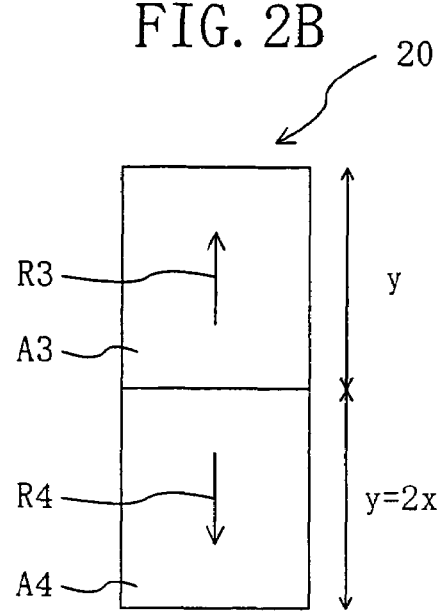
Figure 2C:
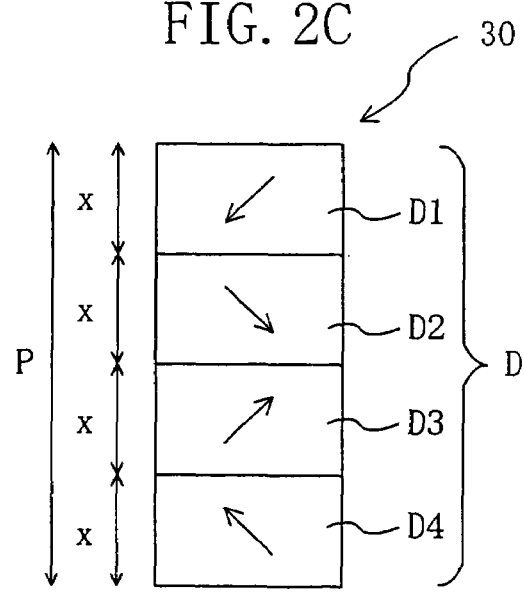

The 4-divided domain D is formed by arranging together the first substrate 10 including the first region A1/the second region A2/the first region A1 formed in this order in the column direction and the second substrate 20 including the third region A3/the fourth region A4 formed in this order in the column direction as illustrated in FIG. 1 (and FIG. 2C). In other words, the first substrate 10 and the second substrate 20 are arranged together so that the first sub-domain D1 is formed between one first region A1 and the third region A3, the second sub-domain D2 is formed between the second region A2 and the third region A3, the third sub-domain D3 is formed between the second region A2 and the fourth region A4, and the fourth sub-domain D4 is formed between the other first region A1 and the fourth region A4. Alternatively, the first direction R1 and the second direction R2 may be reversed from those in the illustrated example, and the third direction R3 and the fourth direction R4 may be reversed from those in the illustrated example. Moreover, the first substrate 10 and the second substrate 20 may alternatively be switched to one another.

As illustrated in FIG. 1 and FIG. 2C, the four sub-domains D1 to D4 in the 4-divided domain D formed as described above have respectively different reference orientation directions. There are two different twist directions, i.e., the clockwise twist direction (D1 and D3) and the counterclockwise twist direction (D2 and D4). The twist direction as used herein is defined as a twist direction as viewed in a direction from the second substrate 20 to the first substrate 10. Therefore, the viewing angle dependence of each sub-domain, which is represented by the reference orientation direction, is different from those of the other sub-domains, and the viewing angle dependence of the liquid crystal display device 100 is averaged for all azimuth angle directions. Particularly, an arrangement in which the first direction R1 and the third direction R3 are perpendicular to each other (and thus the second direction R2 and the fourth direction R4 are perpendicular to each other), as in the illustrated example, is preferred because the viewing angle characteristic is made even more uniform. Moreover, as will be described later, the orientation of the liquid crystal molecules is stabilized, and the formation of a disclination line between sub-domains that unstably moves in response to a change in the electric field is suppressed or prevented. Moreover, in view of the orientation stability, it is preferred that each boundary between sub-domains (D1 to D4) (or each boundary between orientation-regulating regions (between A1 and A2 and between A3 and A4)) extends in a direction perpendicular to the column direction.

Since the area ratio among the sub-domains D1 to D4 influences the viewing angle characteristic of the entire display area, it is preferred that the total area of each of the first sub-domain(s) D1, the second sub-domain(s) D2, the third sub-domain(s) D3 and the fourth sub-domain(s) D4 included in each picture element is equal to those of the others, as in the illustrated example. In the illustrated example, each picture element is occupied by a single 4-divided domain D (i.e., one picture element is substantially made up of only one 4-divided domain D), and the area of each of the first sub-domain D1, the second sub-domain D2, the third sub-domain D3 and the fourth sub-domain D4 in the single 4-divided domain D is equal to those of the others. Specifically, as illustrated in FIG. 2A, the first substrate 10 includes the first region A1/the second region A2/the first region A1 arranged in this order with an area ratio of 1:2:1, whereas as illustrated in FIG. 2B, the second substrate 20 includes the third region A3/the fourth region A4 arranged in this order with an area ratio of 2:2. As a result, the 4-divided domain D is formed in which the first sub-domain D1/the second sub-domain D2/the third sub-domain D3/the fourth sub-domain D4 are arranged in this order with an area ratio of 1:1:1:1. In this example, the area ratio is expressed using the area of each of sub-domains D1 to D4 as a unit area.

The number of sub-domain into which each picture element is divided can suitably be determined in view of the size of a picture element, the display characteristics required for the liquid crystal display device, etc. Note however that it is preferred that each picture element includes at least one 4-divided domain D (made up of sub-domains D1 to D4), and if additional sub-domains are to be provided, it is preferred that they are formed in the direction in which the four sub-domains D1 to D4 are arranged in this order and that they are formed in the same order (cyclically) following the four sub-domains D1 to D4.

Figure 3A:
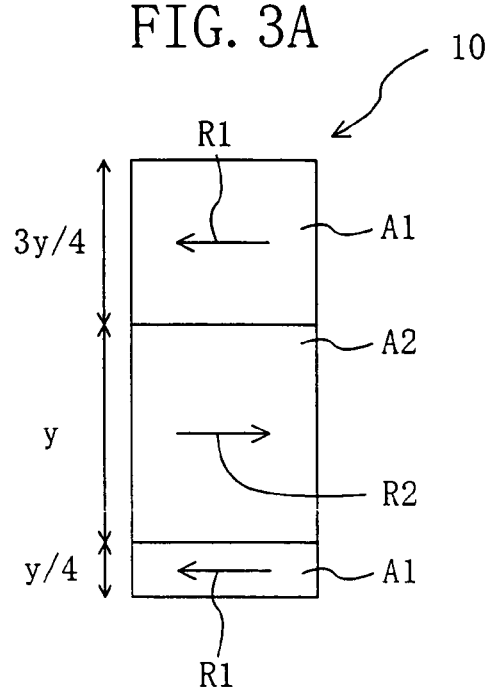
FIG. 3A, FIG. 3B and FIG. 3C are schematic diagrams illustrating a structure of an alternative divided domain formed in each picture element of a liquid crystal display device according to an embodiment of the present invention.
Figure 3B:
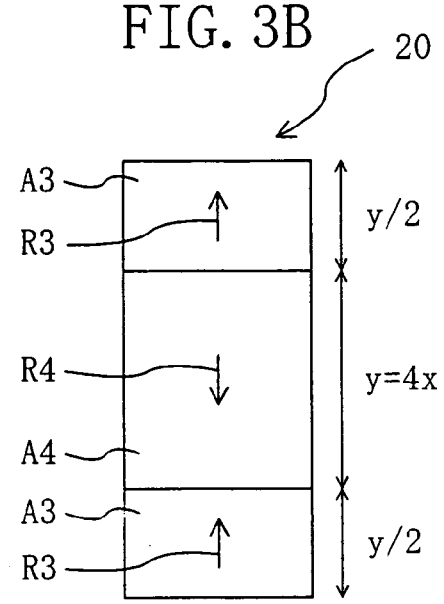
Figure 3C:
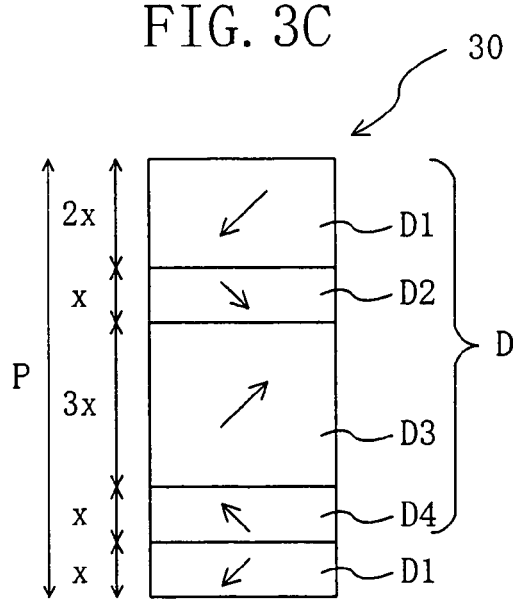

For example, if the first region A1/the second region A2/the first region A1 are formed on the first substrate 10 with an area ratio of 3:4:1, as illustrated in FIG. 3A, and the third region A3/the fourth region A4/the third region A3 are formed on the second substrate 20 with an area ratio of 2:4:2, as illustrated in FIG. 3B, then, a domain is formed including the first sub-domain D1/the second sub-domain D2/the third sub-domain D3/the fourth sub-domain D4/the first sub-domain D1 arranged in this order with an area ratio of 2:1:3:1:1. In this example, the area ratio is expressed using the area of the second sub-domain D2 as a unit area.

Of course, a domain including the fourth sub-domain D4/the first sub-domain D1/the second sub-domain D2/the third sub-domain D3/the fourth sub-domain D4 arranged in this order may alternatively be formed, or an additional second sub-domain D2 or third sub-domain D3 may further be formed. Moreover, two or more 4-divided domains D may alternatively be formed so that the arrangement order of D1 to D4 is repeated cyclically. In any case, the total area of each of the first sub-domain(s) D1, the second sub-domain(s) D2, the third sub-domain(s) D3 and the fourth sub-domain(s) D4 included in each picture element is equal to those of the others so as to realize a uniform viewing angle characteristic.

Now, preferred embodiments of picture element division will be described in detail with reference to FIG. 2A, FIG. 2B, FIG. 2C, FIG. 3A, FIG. 3B and FIG. 3C.

As illustrated in FIG. 2A, FIG. 2B, FIG. 2C, FIG. 3A, FIG. 3B and FIG. 3C, the liquid crystal display device of the present invention includes a 4-divided domain D in each picture element, and the 4-divided domain D is formed by the orientation-regulating forces of the first region A1 and the second region A2 of the first substrate 10 and those of the third region A3 and the fourth region A4 of the second substrate 20.

In the arrangement illustrated in FIG. 2A, FIG. 2B and FIG. 2C, the second region A2 of the first substrate 10 and the fourth region A4 of the second substrate 20 are arranged so as to overlap each other by y/2 in the column direction (where y is the length in the column direction of each of the second region A2 of the first substrate 10 and the third region A3 and the fourth region A4 of the second substrate 20, and y/2 is the length in the column direction of each of the two first regions A1, which are provided on opposite ends of the second region A2 of the first substrate 10 in the column direction), thereby forming a 4-divided domain D that satisfies the relationship x=y/2 (where x is the length in the column direction of each of the sub-domains D1 to D4). Since a single 4-divided domain D is formed across the entirety of one picture element, the relationship P=4x=2y is also satisfied (where P is the length in the column direction of the picture element).

Since FIG. 2A, FIG. 2B and FIG. 2C illustrate only one picture element, the length in the column direction of the first region A1 is shown as y/2. However, a number of picture elements are actually arranged regularly in a matrix, and therefore it is preferred that the first region A1 in one picture element is formed continuously with the first region A1 in the next picture element in the column direction. In such a case, the length in the column direction of the first region A1 is about y (strictly speaking, (y/2)×2+distance between picture elements), and the first region A1 is arranged so that portions thereof (each having a length of y/2) belong to the respective picture elements. This similarly applies to the description of other arrangements of orientation-regulating regions. The length in the column direction of each of the orientation-regulating regions A1 to A4 may be denoted by "y" in spite of the distance between picture elements for the sake of simplicity.

If the above relationships are satisfied, the sub-domains D1 to D4 have an equal area, thereby realizing a uniform viewing angle characteristic. Of course, even if each picture element includes a plurality of equally-divided 4-divided domains D, the total area of each of the sub-domain(s) D1 to D4 is equal to those of the others in each picture element. Therefore, generally, if the relationship P=4nx=2ny (n is a positive integer equal to or greater than 1) is satisfied, a uniform viewing angle characteristic can be realized. However, the effect of stabilizing the orientation may not be obtained if the length of each sub-domain is excessively small. Therefore, the length y in the column direction of each of the orientation-regulating regions A1 to A4 is preferably 10 μm or more, and more preferably 50 μm or more.

While it is generally preferred that a plurality of sub-domains included in each picture element have an equal area, it may not be necessary in some cases. For example, in the arrangement illustrated in FIG. 3A, FIG. 3B and FIG. 3C, the second region A2 and the fourth region A4 are arranged so as to overlap each other by 3y/4 in the column direction (where y is the length in the column direction of each of the second region A2 and the fourth region A4, 3y/4 and y/4 are the respective lengths in the column direction of the two first regions A1, which are formed on opposite ends of the second region A2 in the column direction, and y/2 is the length in the column direction of each of the two third regions A3, which are formed on opposite ends of the fourth region A4 in the column direction), thereby forming a 4-divided domain D including the first sub-domain D1/the second sub-domain D2/the third sub-domain D3/the fourth sub-domain D4 arranged in this order with the respective lengths in the column direction being 2x/x /3x/x (where x is the length in the column direction of the second sub-domain D2 formed in an overlap region between the second region A2 and the fourth region A4), with an additional first sub-domain D1 whose length in the column direction is x being formed following D4.

For the entire picture element divided as described above, the total length in the column direction of the first sub-domain D1. (in proportion to the area thereof) is 3x (=2x+x), which is equal to the length in the column direction of the third sub-domain D3. The length in the column direction of the second sub-domain D2 and that of the fourth sub-domain D4 are both x. As can be seen from FIG. 3C, the reference orientation direction of the first sub-domain D1 and that of the third sub-domain D3 are antiparallel to each other, and the reference orientation direction of the second sub-domain D2 and that of the fourth sub-domain D4 are antiparallel to each other. Therefore, the viewing angle characteristic of the first sub-domain D1 and that of the third sub-domain D3 are complementary to each other, and the viewing angle characteristic of the second sub-domain D2 and that of the fourth sub-domain D4 are also complementary to each other. Therefore, even if not all of the first sub-domain D1 to the fourth sub-domain D4 have an equal total area, a sufficient viewing angle characteristic may be obtained as long as the first sub-domain D1 and the third sub-domain D3 have an equal area and/or the second sub-domain D2 and the fourth sub-domain D4 have an equal area.

Next, a mechanism by which the orientation of the liquid crystal molecules in a 4-divided domain D is stabilized will be described with reference to FIG. 4A, FIG. 4B, FIG. 4C and FIG. 4D.

Figure 4A:
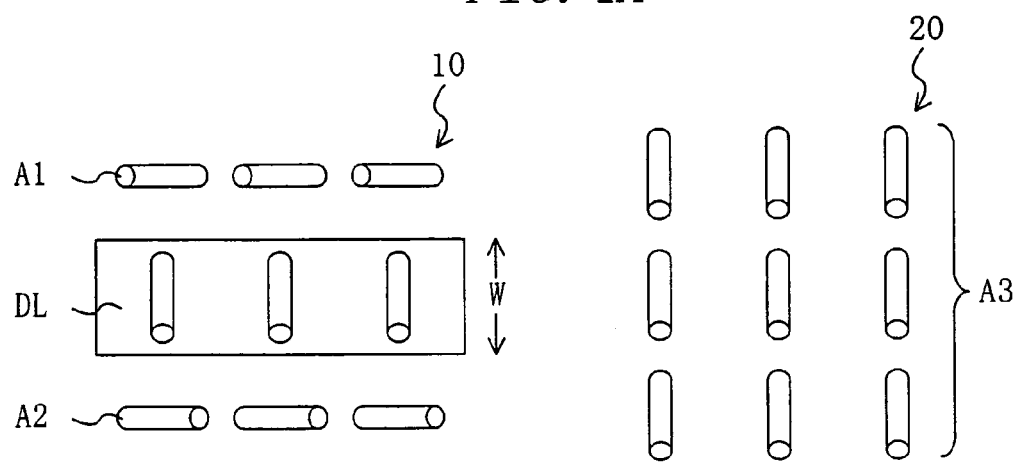
FIG. 4A is a schematic diagram illustrating a mechanism by which an orientation of liquid crystal molecules in the 4-divided domain D is stabilized.
Figure 4B:
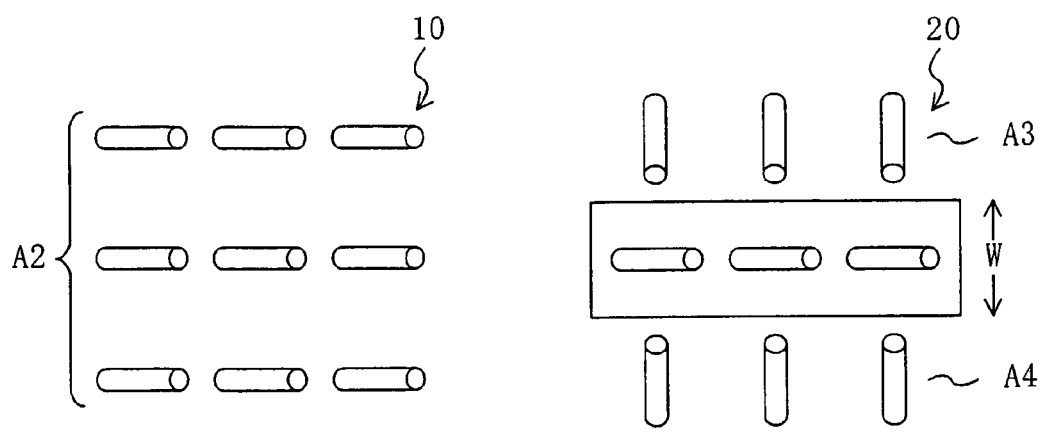
FIG. 4B is a schematic diagram illustrating a mechanism by which an orientation of liquid crystal molecules in the 4-divided domain D is stabilized.
Figure 4C:
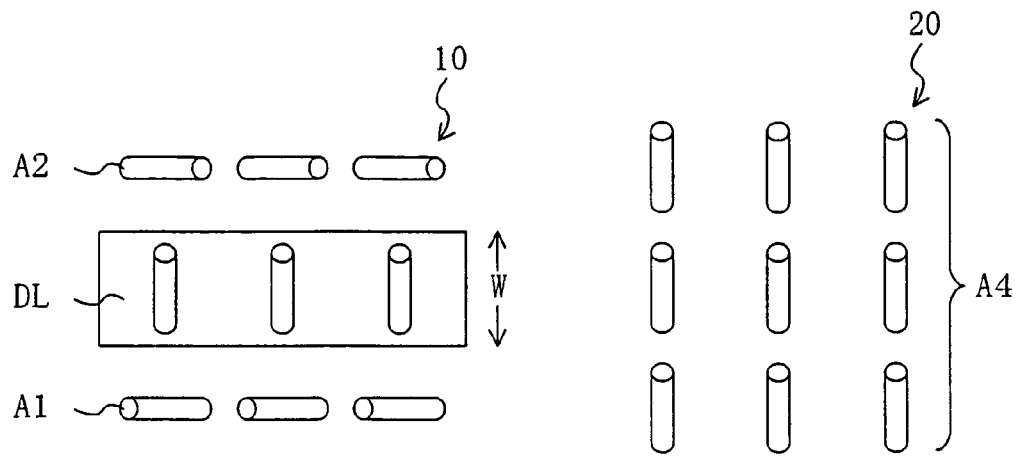
FIG. 4C is a schematic diagram illustrating a mechanism by which an orientation of liquid crystal molecules in the 4-divided domain D is stabilized.
Figure 4D:
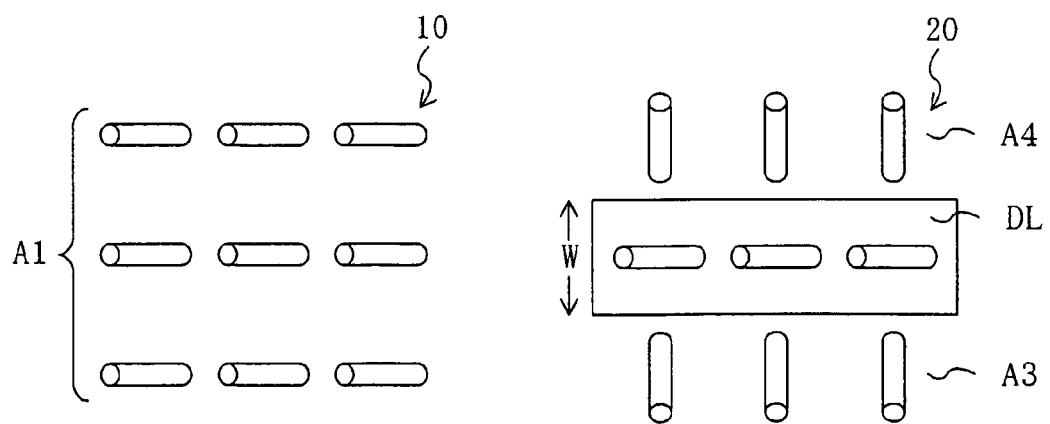
FIG. 4D is a schematic diagram illustrating a mechanism by which an orientation of liquid crystal molecules in the 4-divided domain D is stabilized.

FIG. 4A, FIG. 4B, FIG. 4C and FIG. 4D schematically illustrate an orientation of the liquid crystal molecules 30a of the liquid crystal layer 30 in the presence of an applied voltage in the liquid crystal display device 100 illustrated in FIG. 1, FIG. 2A, FIG. 2B and FIG. 2C. Each of FIG. 4A, FIG. 4B, FIG. 4C and FIG. 4D illustrates the orientation direction of the liquid crystal molecules 30a as the display plane is observed from the substrate. 20 side along the display plane normal. FIG. 4A illustrates a location in the vicinity of the boundary between the first sub-domain D1 and the second sub-domain D2, FIG. 4B illustrates a location in the vicinity of the boundary between the second sub-domain D2 and the third sub-domain D3, FIG. 4C illustrates a location in the vicinity of the boundary between the third sub-domain D3 and the fourth sub-domain D4, and FIG. 4D illustrates a location in the vicinity of the boundary between the fourth sub-domain D4 and the first sub-domain D1. Note that since each picture element is occupied by a single 4-divided domain D in the example illustrated in FIG. 1, FIG. 2A, FIG. 2B and FIG. 2C, the location in the vicinity of the boundary illustrated in FIG. 4D is between two picture elements adjacent to each other in the column direction (i.e., two picture elements belonging to different rows adjacent to each other). In the arrangement illustrated in FIG. 3A, FIG. 3B and FIG. 3C, this location is within the picture element (in the bottom portion of the illustrated picture element).

As illustrated in FIG. 4A, FIG. 4B, FIG. 4C and FIG. 4D, a division line DL is formed between different orientation-regulating regions adjacent to each other. In a 4-divided domain formed in a picture element of the liquid crystal display device of the present invention, the division line DL formed on one substrate (the first substrate 10 or the second substrate 20) is always located so as to oppose an orientation-regulating region formed on the other substrate (the second substrate 20 or the first substrate 10). The division line DL between the first region A1 and the second region A2 formed on the first substrate 10 illustrated in FIG. 4A opposes the third region A3 formed on the second substrate 20, and the division line DL between the third region A3 and the fourth region A4 formed on the second substrate 20 illustrated in FIG. 4B opposes the second region A2 formed on the first substrate 10. The division line DL between the second region A2 and the first region A1 formed on the first substrate 10 illustrated in FIG. 4C opposes the fourth region A4 formed on the second substrate 20, and the division line DL between the fourth region A4 and the third region A3 formed on the second substrate 20 illustrated in FIG. 4D opposes the first region A1 formed on the first substrate 10.

With the orientation-regulating regions A1 to A4 being arranged as described above, the liquid crystal molecules 30a located along a division line DL on one substrate are oriented by the influence of an orientation-regulating force from an orientation-regulating region of the other substrate. The orientation-regulating direction of the first region A1 and the second region A2 formed on the first substrate 10 and the orientation-regulating direction of the third region A3 and the fourth region A4 formed on the second substrate 20 cross each other (preferably perpendicular to each other). While a division line DL is required to have a finite width W, which depends on the nature of the liquid crystal material as a continuum, in order for the liquid crystal molecules 30a to take a continuous orientation, the width W is very small and is a size on the level of the liquid crystal molecules 30a. Thus, the width W of a division line DL is very small with respect to the length (width) y in the column direction of the opposing orientation-regulating region.

Under the positional relationship as described above, the liquid crystal molecules 30a located along a division line DL are influenced by a unidirectional orientation-regulating force from the opposing orientation-regulating region and the flow effect of the liquid crystal material even if the voltage applied across the liquid crystal layer is switched from one to another at a high speed, whereby the position of the division line DL does not move, a reverse tilt domain does not occur in the sub-domains D1 to D4, or a disclination line does not occur between sub-domains. Thus, the orientation of a divided domain is stabilized according to the present invention. In order to sufficiently obtain the stabilizing effect, the angle between the orientation-regulating direction (R1 and R2) of the first region A1 and the second region A2 and the orientation-regulating direction (R3 and R4) of the third region A3 and the fourth region A4 is preferably in the range of about 89° to about 91°, and more preferably about 90°.

The liquid crystal display device 100 of the present invention includes the vertical alignment type liquid crystal layer 30, and therefore is preferably used for displaying an image in a normally black mode (referred to simply as an "NB mode"). When an image is displayed in an NB mode, it is possible to realize a display with a higher contrast ratio than a conventional TN type NW mode liquid crystal display device.

The viewing angle characteristic of the NB mode liquid crystal display device 100 including a vertical alignment type liquid crystal layer can be further improved by providing a polarizer and a phase difference compensator as follows.

A pair of polarizers (not shown) are arranged in a crossed Nicols state so as to oppose each other via the first substrate 10 and the second substrate 20 therebetween, and a phase difference compensator (not shown) is provided between one of the pair of polarizers and the first substrate 10 and/or between the other polarizer and the second substrate 20. The phase difference compensator may be arranged so that the slow axis of the phase difference compensator lies in the plane of the liquid crystal layer 30 (parallel to the substrates 10 and 20) and extends perpendicular to the absorption axis (perpendicular to the polarization axis) of one of the pair of polarizers that is closer to the observer. Particularly, if a phase difference compensator is provided between one of the polarizers and one of the substrates and between the other polarizer and the other substrate so that the slow axis of each phase difference compensator extends perpendicular to the absorption axis of the polarizer that is closer to the phase difference compensator, the viewing angle characteristic (polar angle (angle with respect to the display plane normal) dependence) in the 45° direction (azimuth angle direction) with respect to the absorption axis of the polarizer closer to the observer is significantly improved, whereby it is possible to obtain a desirable viewing angle characteristic in all azimuth angle directions.

Specifically, a phase difference compensator is provided between one of the pair of polarizers and one of the substrates and between the other polarizer and the other substrate so that the slow axis of the phase difference compensator is perpendicular to the absorption axis of the polarizer closer to the phase difference compensator, with the retardation of the liquid crystal layer 30 being 340 nm, for example. Then, the contrast ratio is measured for various viewing angle directions (azimuth angle directions) of 0°, 45°, 90° and 135° at a polar angle of 40°, while changing the in-plane retardation, Re(=df·(nx−ny)), of the phase difference compensator in the range of 0 to 50 nm and the normal direction retardation, Rth(=df·(nx−nz)), in the range of 0 to 150 nm, thus obtaining the results shown in FIG. 5 and FIG. 6. Herein, df is the thickness of the phase difference compensator, nx and ny are the principal refractive indices in the plane, and nx is the principal refractive index in the plane normal direction, wherein nx>ny>nz.

Figure 5:
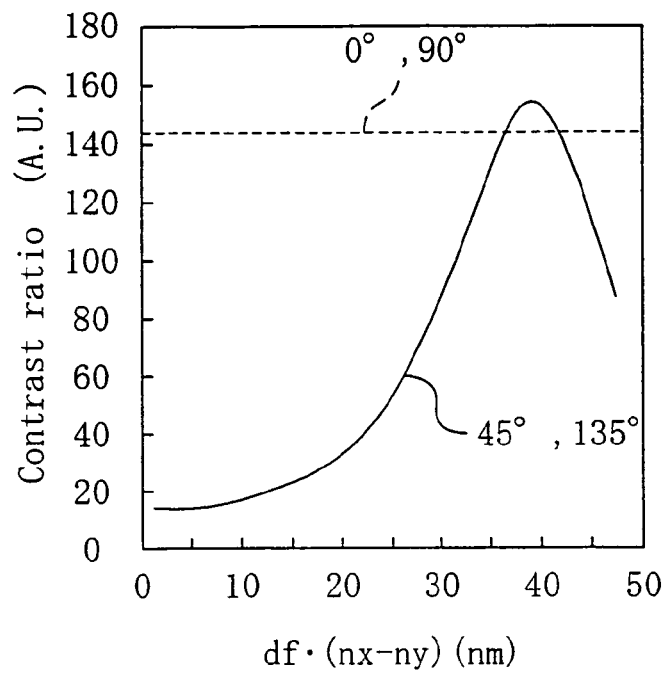
FIG. 5 is a graph illustrating a dependence of a contrast ratio of a liquid crystal display device according to an embodiment of the present invention on an in-plane retardation Re (=df·(nx−ny)) of a phase difference compensator.
Figure 6:
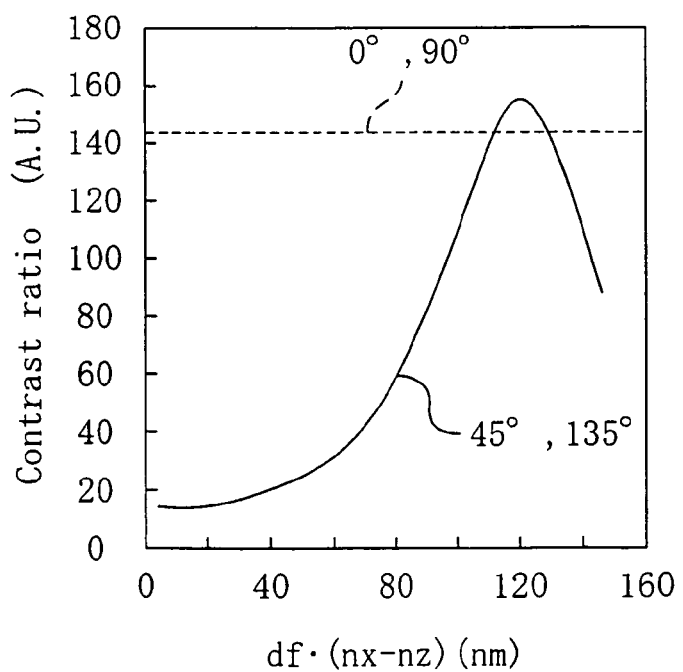
FIG. 6 is a graph illustrating a dependence of a contrast ratio of a liquid crystal display device according to an embodiment of the present invention on a normal direction retardation Rth(=df (nx−nz)) of a phase difference compensator.

As is apparent from FIG. 5 and FIG. 6, the contrast ratio is constant and is not dependent on the polar angle in azimuth angle directions of 0° and 90° with respect to the absorption axis direction of the polarizer, whereas the contrast ratio is dependent on the polar angle and exhibits a local maximum value in azimuth angle directions of 45° and 135°. When the in-plane retardation Re has a value in the range of 36 nm to 43 nm, and the normal direction retardation Rth has a value in the range of 110 nm to 130 nm, it is possible to realize a substantially isotropic contrast ratio in all azimuth angle directions. Most suitably, the value of the in-plane retardation Re is 39 nm and the value of the normal direction retardation Rth is 122 nm. In this example, the most suitable retardation values have been shown in a case where a phase difference compensator is provided on both sides of the liquid crystal layer. In a case where a phase difference compensator is provided only on one side, a phase difference compensator having a retardation value twice the value shown above can be used. The liquid crystal layer may suitably have a retardation in the range of 250 nm to 400 nm.

When the liquid crystal layer 30 has a thickness of 4 μm or less, it is possible to realize a desirable response speed. Specifically, it is possible to realize a response time (Ts) of 16.6 msec or less, where Ts is represented as the sum of the amount of time ("Ton" in an NB mode) required for the transmittance to change from 0% to 90% and the amount of time ("Toff" in an NB mode) required for the transmittance to change from 100% to 10%. It is preferred that the thickness of the liquid crystal layer 30 is in the range of 3 μm to 4 μm.

Next, a method for producing a liquid crystal display device according to the present invention will be described.

As described above, a 4-divided domain of the present invention is formed by a combination of two kinds of orientation-regulating regions A1 and A2 formed on the first substrate 10 and other two kinds of orientation-regulating regions A3 and A4 formed on the second substrate 20. The four orientation-regulating regions are arranged in a predetermined order in the column direction. Thus, the arrangement can be produced by arranging first regions A1 and second regions A2, each extending in the row direction, alternately in the column direction on one surface of the first substrate 10 that is closer to the liquid crystal layer 30, arranging third regions A3 and fourth regions A4, each extending in the row direction, alternately in the column direction on one surface of the second substrate 20 that is closer to the liquid crystal layer 30, and then attaching the first substrate 10 and the second substrate 20 together so that the orientation-regulating regions A1 to A4 are in the positional relationship as described above for each picture element. Neglecting the distance between picture elements, the length in the column direction of each of the orientation-regulating regions A1 to A4 is y. Thus, the 4-divided domain of the present invention can be realized by forming the orientation-regulating regions A1 to A4 each in a stripe pattern parallel to the row direction so as to lie on a row of picture elements among the plurality of picture elements.

A method for producing a liquid crystal display device according to one embodiment of the present invention will now be described with reference to FIG. 7A, FIG. 7B, FIG. 7C and FIG. 7D.

Figure 7A:
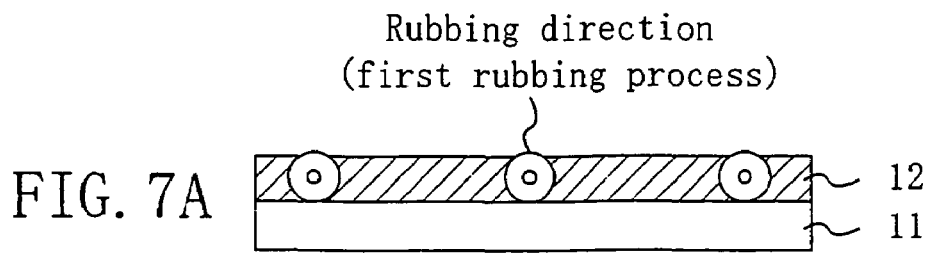
FIG. 7A, FIG. 7B, FIG. 7C and FIG. 7D are schematic cross-sectional views illustrating an embodiment of a method for producing a liquid crystal display device according to the present invention.

First, a substrate (e.g., a glass substrate) 11 to be the first substrate 10 and the second substrate 20 is prepared. A vertical alignment film 12 is formed on the substrate 11 and rubbed in one direction, as illustrated in FIG. 7A. In the illustrated example, the vertical alignment film 12 is rubbed toward the viewer of the drawing in a direction normal to the plane of the drawing sheet.

Figure 7B:
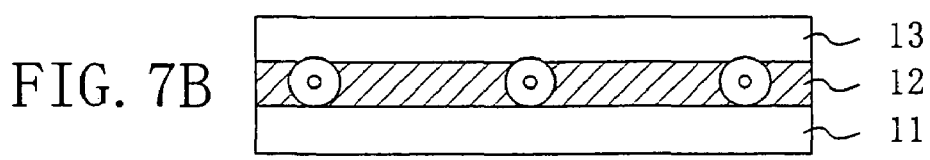

Then, a photosensitive resin layer 13 is formed so as to cover the entire surface of the alignment film 12, which has undergone the first rubbing process, as illustrated in FIG. 7B.

Figure 7C:
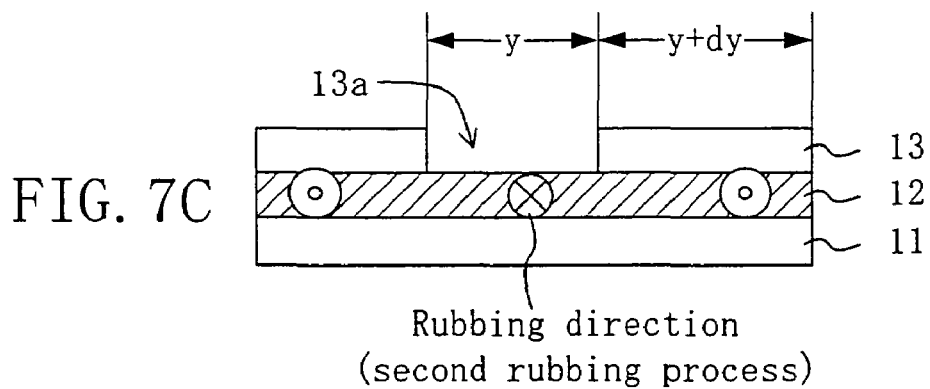

The photosensitive resin layer 13 is exposed by using a predetermined photomask and developed so that it is patterned as illustrated in FIG. 7C. In this process, typically, a plurality of strip-shaped openings 13a (corresponding to second regions A2 or fourth regions A4, for example) each having a width of y are provided in parallel to one another at an interval of y+dy (dy is the distance between picture elements). The region covered by the photosensitive resin layer 13 includes a region to be a first region A1 or a third region A3, for example. Then, the vertical alignment film 12 exposed through the openings 13a is subjected to a second rubbing process. The direction of the rubbing process is opposite (antiparallel) to that of the first rubbing process. Employing the picture element division pattern of the present invention, it is only required to form a stripe pattern parallel to the row direction, thereby providing an advantage that the liquid crystal display device can be produced easily without the need to position a photomask in directions other than the direction of division (the column direction in this example).

Figure 7D:
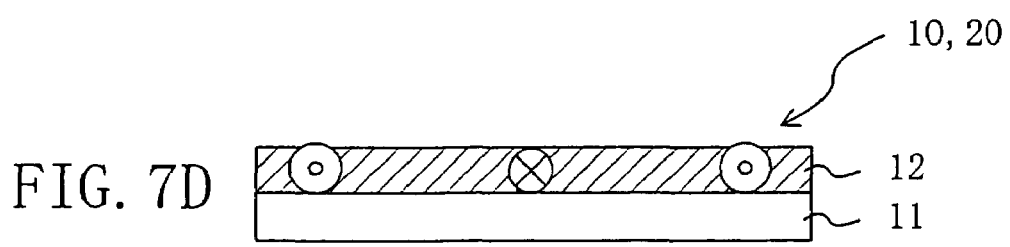

Then, the photosensitive resin layer 13 is removed to obtain the first substrate 10 or the second substrate 20 as illustrated in FIG. 7D.

The individual steps in the above description can be performed by a known method. The same or similar results can be obtained by alternatively using a so-called "mask rubbing process" using a metal hard mask or a so-called "optical alignment process" in which the pretilt angle is controlled by illuminating UV light from an inclined direction, instead of using the so-called "divided rubbing process".

The first substrate 10 and the second substrate 20, which have been obtained as described above, are attached to each other via a spacer (e.g., 3.5 μm) for maintaining a predetermined cell gap (corresponding to the thickness of the liquid crystal layer 30) with the respective vertical alignment films 12 facing each other, thus obtaining a liquid crystal cell. The divided rubbing process is performed so that regions that are rubbed in respective directions antiparallel to each other overlap with each other in a predetermined positional relationship as described above (e.g., so that the regions overlap with each other by a width of y/2). It is preferred that the spacer is provided in a dotted manner in a region other than picture elements (e.g., a region where the black matrix is formed) by using a photosensitive resin, or the like.

A liquid crystal material is injected into the obtained liquid crystal cell. It is preferred that the liquid crystal material is such that the retardation of the liquid crystal cell is in the range of 250 nm to 400 nm, and the birefringence (Δn) is 0.07 or more so that the thickness of the liquid crystal layer is 4 μm or less. With such a liquid crystal layer, the viewing angle characteristic is improved by the phase difference compensator as described above, and it is possible to obtain a liquid crystal display device having a desirable response characteristic.

The step of injecting a liquid crystal material can be performed by a known method. Note however that it is preferred that after the injection of the liquid crystal material, the liquid crystal cell is held for a predetermined period of time (e.g., 10 min) or more at a temperature equal to or greater than the Tni point (nematic-isotropic liquid transition temperature) of the liquid crystal material (more preferably at a temperature that is higher than the Tni point by 10° C. or more), after which it is cooled to normal temperature (25° C.). In this process, the temperature decreasing rate is preferably 10° C./min or less, and more preferably 10° C./h or less. By performing a realignment process as described above, it is possible to form a divided domain having a uniform and stable orientation across the entire display area.

EXAMPLE 1

Production of a TFT type liquid crystal display device having picture elements of a divided orientation pattern as described in the above embodiment with reference to FIG. 1, FIG. 2A, FIG. 2B and FIG. 2C will now be described. The direction of division is the column direction, and each picture element is substantially occupied by a single 4-divided domain. The basic arrangement is the same as that of the liquid crystal display device 100 described above, and thus the same reference numerals are used and the arrangement will not be further described below.

The TFT substrate to be the first substrate 10 and the color filter substrate to be the second substrate 20 may be any of those known in the art. First, an example using the above-described divided rubbing method will be described with reference to FIG. 7.

The vertical alignment film 12 having a thickness of 60 nm is formed by using, for example, a polyimide-based vertical alignment film material manufactured by JSR Corporation (e.g., JALS-682) on the TFT substrate and on the color filter substrate. The vertical alignment film 12 is subjected to a uniaxial rubbing process (the first rubbing process) in a predetermined direction, washed with pure water, and then the photosensitive resin layer 13 having a thickness of 0.5 μm is formed thereon by using, for example, a positive type resist manufactured by Shipley Company (e.g., S1805).

The photosensitive resin layer 13 is exposed via a photomask having a predetermined stripe pattern at an exposure of 35 mJ (central wavelength: 365 nm) by using, for example, a mask exposure apparatus manufactured by Japan Science Engineering Co., Ltd. Then, the photosensitive resin layer 13 is developed by using, for example, MP-DEV inorganic alkaline developer manufactured by Shipley Company. Thus, the photosensitive resin layer 13 is patterned to form the openings 13a in a stripe pattern.

Then, the vertical alignment film 12 exposed through the openings 13a of the photosensitive resin layer 13 is subjected to a second uniaxial rubbing process in a direction opposite (antiparallel) to that of the first rubbing process. Then, the photosensitive resin layer 13 is stripped away by using a remover (e.g., a 10% aqueous solution of NaOH).

It is preferred that the first and second rubbing processes are performed under the following condition, for example. That is, the rubbing cloth: YA-18-R (pile length: 1.8 mm) manufactured by Yoshikawa Chemical Co., Ltd., the pushing depth: 0.4 mm, the rotational speed of the roller: 300 mm/min, the stage velocity: 100 mm/sec, and the number of iterations: 5. This condition is a soft rubbing condition with which a rubbing streak does not occur, and the rubbing process is preferably performed with a high rubbing density.

In a case where an optical alignment process is employed, the liquid crystal display device can be produced as follows, for example.

First, a vertical alignment film having a thickness of 100 nm is formed on a TFT substrate and on a color filter substrate by using, for example, a vertical alignment film material, RN-1338, manufactured by Nissan Chemical Industries, Ltd.

The entire surface of the vertical alignment film is irradiated with polarized UV (central wavelength: 313 nm), which has been polarized by using a dielectric mirror, with a density of 1 J/cm². In view of the voltage holding capacity, it is preferred that the density of UV illumination (exposure energy) is 1 J/cm² or less. Then, the polarized UV is illuminated via a quartz photomask from a direction at 45°, for example, with respect to the normal to the substrate according to a predetermined pattern. However, the direction of illumination of the polarized UV is not limited to 45°, but may alternatively be any other direction that is inclined with respect to the normal to the substrate (i.e., any direction other than 0° and 90°). With this method, the liquid crystal molecules are oriented in a direction perpendicular to the polarization direction of the polarized UV, whereby a 4-divided domain can be formed by changing the polarization direction of the polarized UV for the respective regions.

Then, the TFT substrate and the color filter substrate are attached to each other with a cell gap of 3.5 μm, and a liquid crystal material is injected into the obtained liquid crystal cell. The liquid crystal material, e.g., MJ001025 ($\Delta n=0.0916$, $\Delta \epsilon=-2.4$, Tni=80° C.), an Nn liquid crystal material manufactured by Merck & Co., Inc., is injected into the liquid crystal cell while heating the liquid crystal cell to about 60° C., and then the liquid crystal cell is sealed. Then, the realignment process is performed by holding the liquid crystal cell in an oven whose temperature is set to about 120° C. for about 10 minutes, and then gradually cooling the liquid crystal cell to normal temperature (25° C.) at a temperature decreasing rate of 10° C./h.

The liquid crystal cells obtained as described above all had a liquid crystal molecule pretilt angle of 88° Various studies have shown that the pretilt angle of the liquid crystal molecules is preferably 88° or more (<90°) so that a divided domain is formed stably. It is believed that this is also dependent on the expression of a pretilt angle (i.e., the expression of a force that regulates the orientation direction) through an alignment process (a rubbing process, an optical alignment process, or the like), and the chemical characteristics of the alignment film such as the resistance to pure water washing, the solvent resistance, or the alkaline developer resistance.

Then, polarizers and phase difference compensators are arranged on the obtained liquid crystal cell to produce an NB mode liquid crystal display device.

The phase difference compensator, e.g., a phase difference compensation film (in-plane retardation: 39 nm, normal direction retardation: 122 nm) made from a biaxially oriented film of a norbornene resin or a film of a liquid crystal polymer, is arranged between each polarizer and the corresponding substrate.

The viewing angle characteristic (iso-contrast contour) of the liquid crystal display device obtained as described above is illustrated in FIG. 8. As is apparent from FIG. 8, a desirable display is realized for all azimuth angles around 360°. Although not shown in FIG. 8, in all azimuth angle directions, a display with a contrast ratio (CR) of 10 or more was realized for polar angles of ±80° or more.

Figure 9:
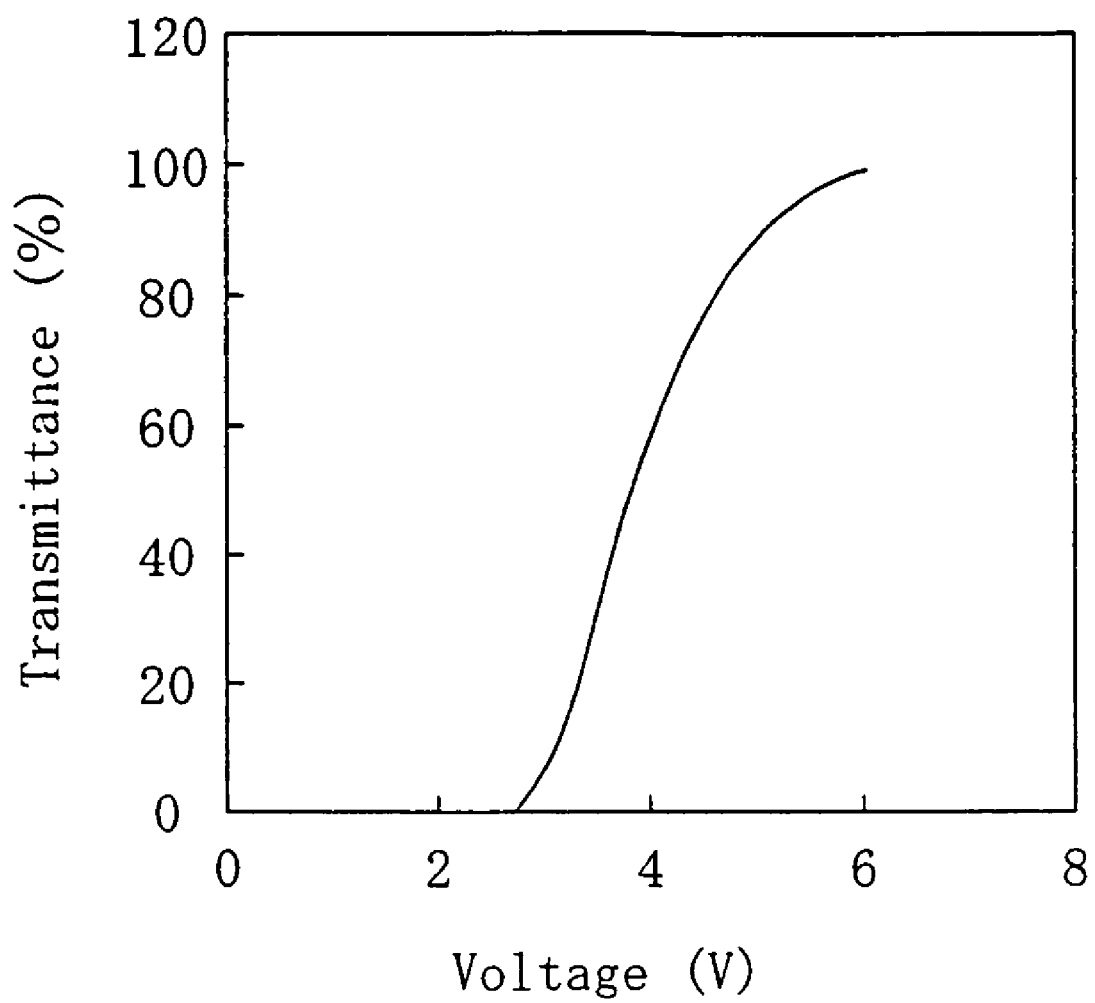
FIG. 9 is a graph illustrating a voltage-transmittance characteristic of the liquid crystal display device of Example 1.

As illustrated in FIG. 9, the voltage-transmittance characteristic of the liquid crystal display device is steep, and it is possible to produce a display with a desirable contrast ratio in the range of 2.5 V to 6 V. Moreover, the response time Ts of the liquid crystal display device is 13 msec, indicating a desirable motion picture display characteristic. The response time in an intermediate gray level display was 18 msec.

Figure 10:
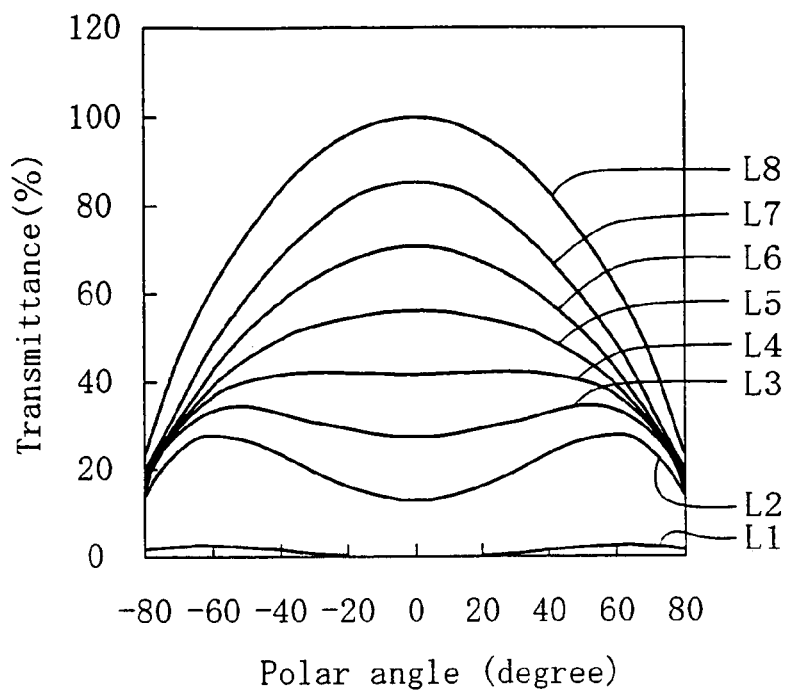
FIG. 10 is a graph illustrating a polar angle dependence (in the direction of azimuth angle 0°) of a gray level display characteristic of the liquid crystal display device of Example 1.
Figure 11:
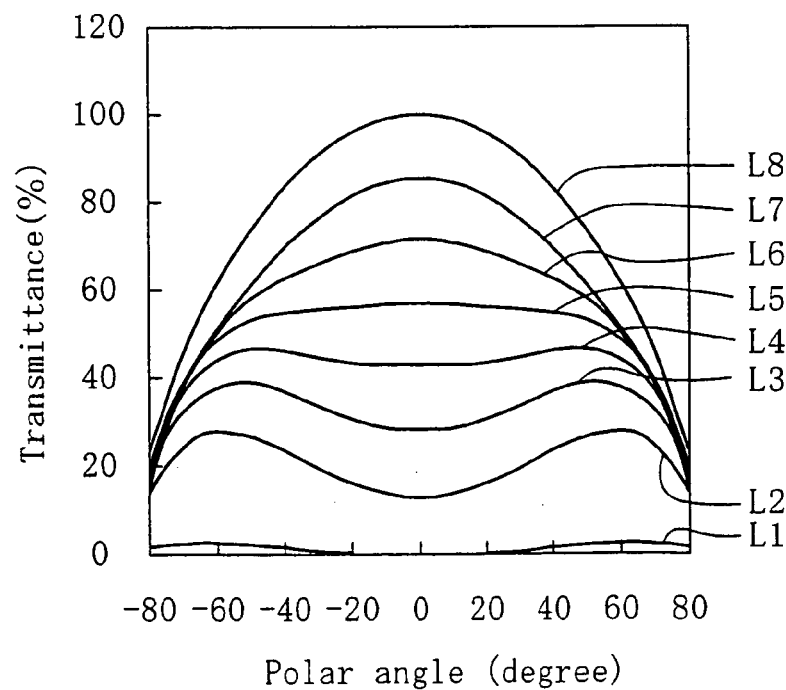
FIG. 11 is a graph illustrating a polar angle dependence (in the direction of azimuth angle 45°) of a gray level display characteristic of the liquid crystal display device of Example 1.

FIG. 10 and FIG. 11 illustrate the results of an evaluation for the gray level display characteristic of the liquid crystal display device. Curves L1 to L8 represent the polar angle (angle with respect to the display plane normal) dependence of the transmittance for eight different gray levels of increasing degrees of brightness, respectively, with the curve L1 corresponding to a black display. FIG. 10 illustrates the results for an azimuth angle direction of 0°, and FIG. 11 illustrates the results for an azimuth angle direction of 45°.

As is apparent from a comparison between FIG. 10 and FIG. 11, the polar angle dependence of the transmittance is small for either azimuth angle direction, and the polar angle dependences for these azimuth angle directions are close to each other. This shows that the liquid crystal display device of this example is capable of producing a desirable display in all azimuth angle directions even in an intermediate gray level display.

EXAMPLE 2

In this example, the present invention is applied to a plasma addressed liquid crystal display device (hereinafter referred to simply as a "PALC").

Figure 12:
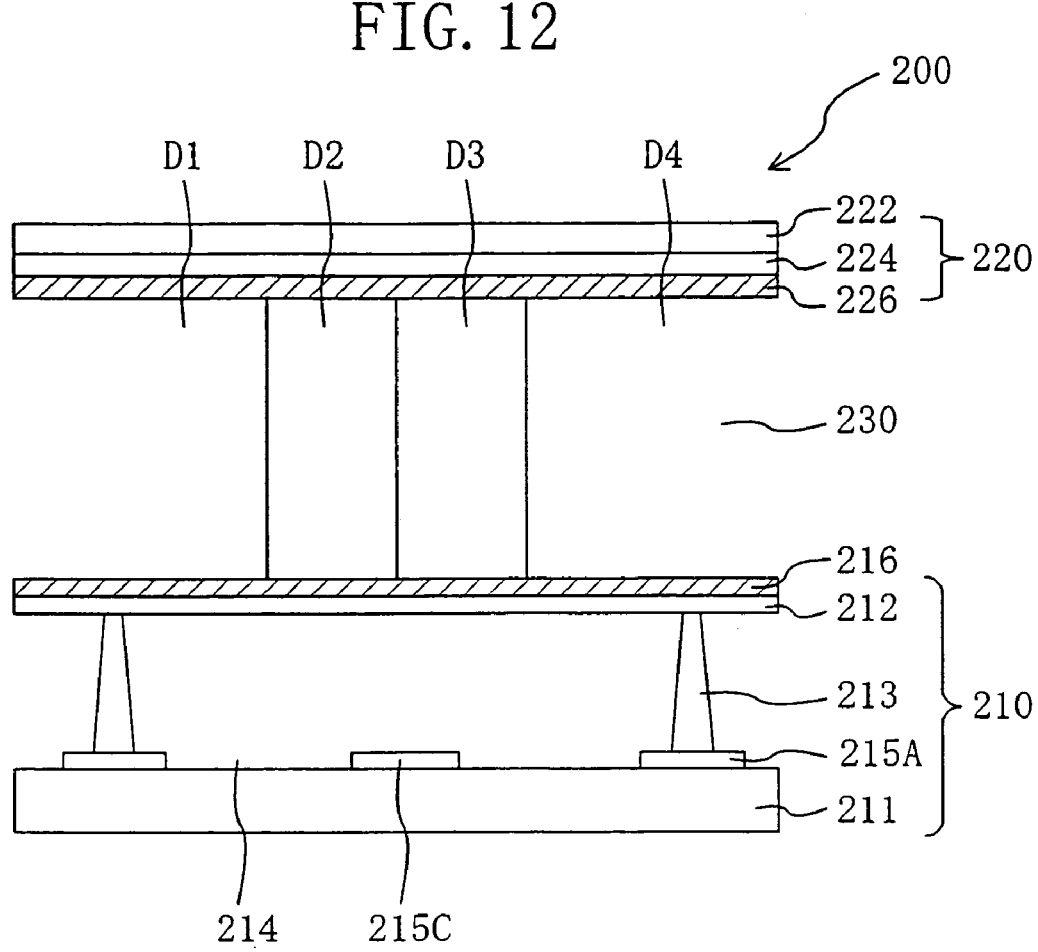
FIG. 12 is a schematic cross-sectional view illustrating a structure of a PALC 200 of Example 2.

FIG. 12 illustrates a PALC 200 including a liquid crystal layer 230, a plasma address substrate 210 and a color filter substrate 220. The plasma address substrate 210 and the color filter substrate 220 oppose each other via the liquid crystal layer 230 therebetween.

The plasma address substrate 210 includes a plasma support substrate (e.g., a glass substrate) 211, a dielectric sheet (e.g., a thin plate glass) 212, and a partition (e.g., made from a glass frit) 213 provided between the plasma support substrate 211 and the dielectric sheet 212. The stripe-pattern space surrounded by these components is filled with an ionizable gas, and the space forms a plasma channel 214. A cathode 215C and an anode 215A are formed in the plasma channel 214 for applying a voltage to the gas in the plasma channel 214 to cause a plasma discharge. The plasma channel 214 functions as, for example, a scanning line. The dielectric sheet 212 is provided on one side of the plasma substrate 210 that is closer to the liquid crystal layer 230, and a vertical alignment film 216 is provided on one surface of the dielectric sheet 212 that is closer to the liquid crystal layer 230.

The color filter substrate 220 includes a transparent substrate (e.g., a glass substrate) 222 having a color filter layer (not shown), a counter electrode 224, and a vertical alignment film 226 provided on the counter electrode 224. The counter electrode 224 is an electrode of a stripe pattern and is arranged so as to cross the plasma channel 214. Each area where the counter electrode 224 intersects with the plasma channel 214 forms a picture element. The counter electrode 224 functions as, for example, a signal line.

When a plasma discharge is caused in the plasma channel 214 by the voltage applied between the cathode 215C and the anode 215A, the surface of the dielectric sheet 212 that is closer to the plasma channel 214 is brought to the cathode potential via the plasma channel 214 being in a discharged state. The surface of the dielectric sheet 212 that is closer to the plasma channel 214 (hereinafter referred to as the "lower surface") functions as a virtual electrode. Thus, the voltage between the lower surface of the dielectric sheet 212 (virtual electrode) and the counter electrode 224 is applied to the dielectric sheet 212 and the liquid crystal layer 230, whereby a voltage that is determined by the capacitance ratio therebetween is applied across the liquid crystal layer 230. Therefore, as the thickness of the dielectric sheet 212 is smaller, the voltage applied across the liquid crystal layer 230 is higher. In order to prevent the liquid crystal material from deteriorating due to ultraviolet rays (wavelength: 250 nm to 350 nm) occurring in the plasma channel 214, it is preferred that a material that blocks the ultraviolet rays is mixed in the dielectric sheet 212 or applied on the surface of the dielectric sheet 212, The PALC 200 can be produced by a known method. The present invention can also be applied to other types of PALCs known in the prior art. In this example, the PALCs 200 having a 4-divided domain for each picture element as in Example 1 were produced using the dielectric sheets 212 whose thicknesses were 30 μm, 40 μm and 50 μm, respectively.

Figure 13:
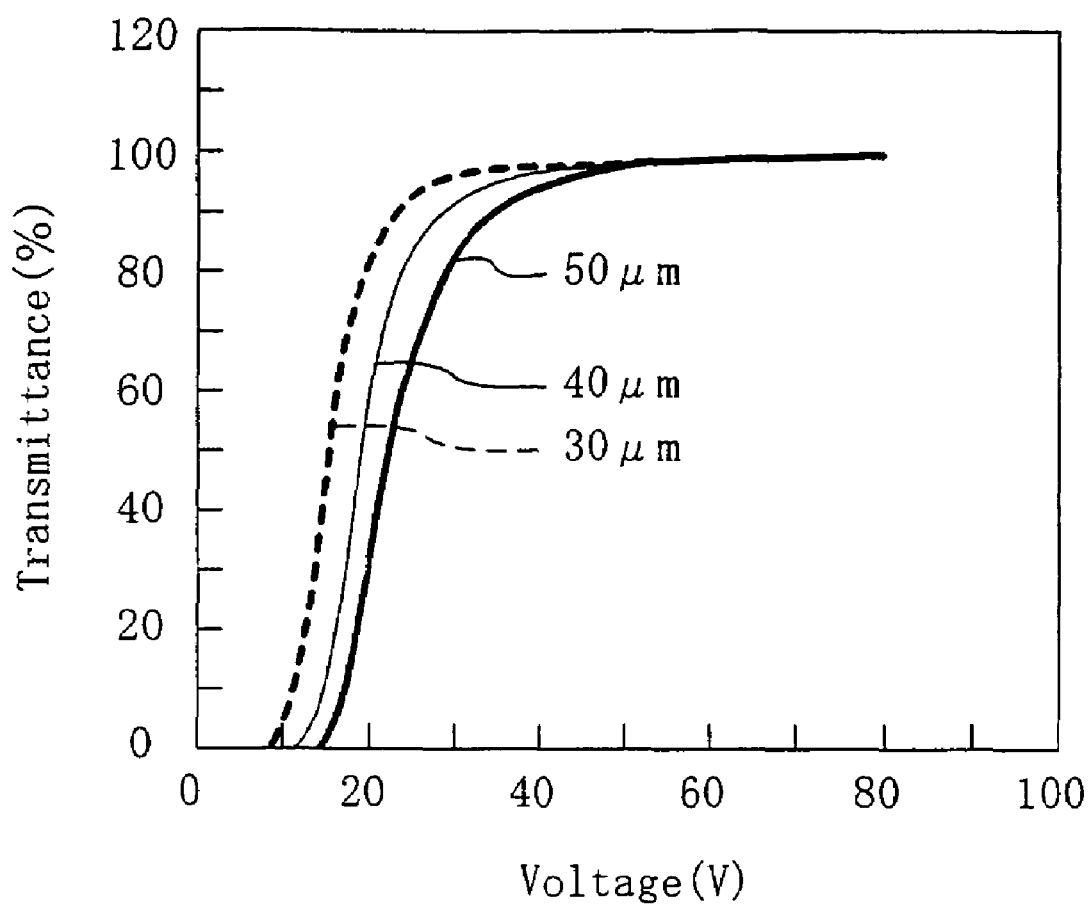
FIG. 13 is a graph illustrating a voltage-transmittance characteristic of the PALC 200 of Example 2.

FIG. 13 illustrates the voltage-transmittance characteristics of the obtained PALCs 200. As is apparent from FIG. 13, each PALC 200 has a steep voltage-transmittance characteristic. The response time Ts was 16 msec for the one whose dielectric sheet 212 was 50 μm thick, and 10 msec for the one whose dielectric sheet 212 was 30 μm thick. It can be seen that any of the PALCs 200 has a response speed that is sufficient for a motion picture display. As for the viewing angle characteristic, a display with a contrast ratio of 10 or more was realized for polar angles of ±70° or more in all azimuth angle directions.

Moreover, the orientation of the liquid crystal molecules was stable, and substantially no occurrence of a disclination line was observed.

EXAMPLE 3

Figure 14:
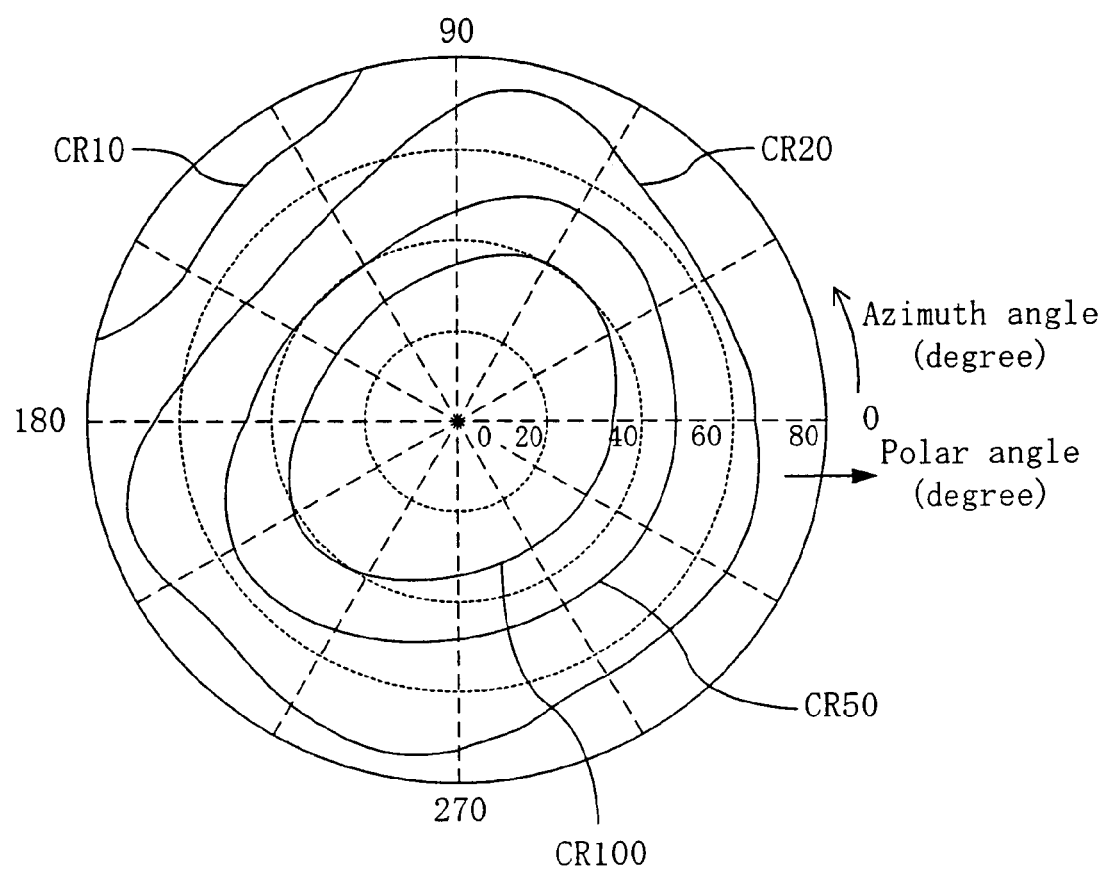
FIG. 14 is an iso-contrast contour illustrating a viewing angle characteristic of a liquid crystal display device of Example 3.

A liquid crystal display device was produced as in Example 1 except that five sub-domains (including a 4-divided domain D) were formed in each picture element as illustrated in FIG. 3. FIG. 14 illustrates the viewing angle characteristic (iso-contrast contour) of the obtained liquid crystal display device.

Figure 8:
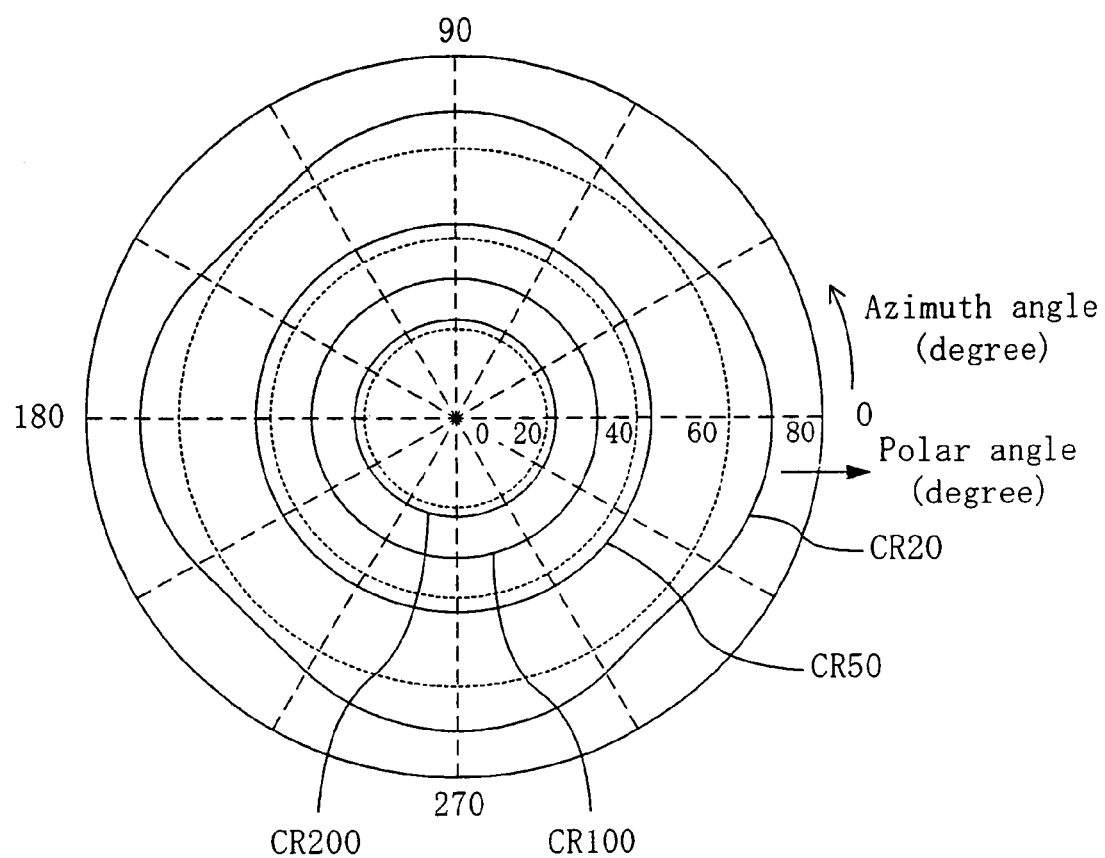
FIG. 8 is an iso-contrast contour illustrating a viewing angle characteristic of a liquid crystal display device of Example 1.

In comparison with the viewing angle characteristic of the liquid crystal display device of Example 1 illustrated in FIG. 8, the degree of azimuth angle dependence of the contrast ratio is slightly greater, but a desirable display was realized substantially in all azimuth angle directions. Moreover, the response speed was substantially the same as that of the liquid crystal display device of Example 1, and the orientation of the liquid crystal molecules was also stable, with substantially no occurrence of a disclination line being observed.

COMPARATIVE EXAMPLE 1

Figure 15A:
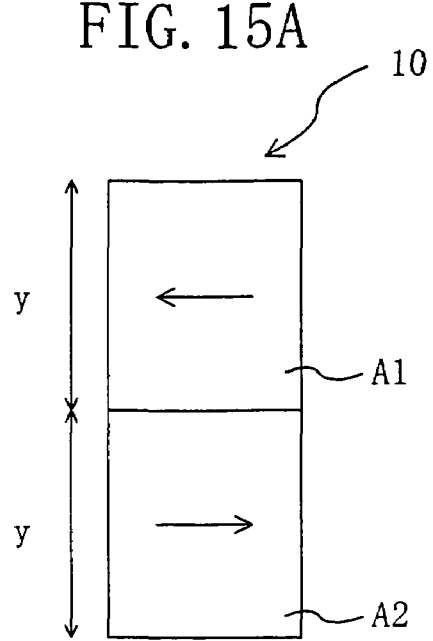
FIG. 15A, FIG. 15B and FIG. 15C are schematic diagrams illustrating an arrangement of a divided domain of a liquid crystal display device of Comparative Example 1.
Figure 15B:
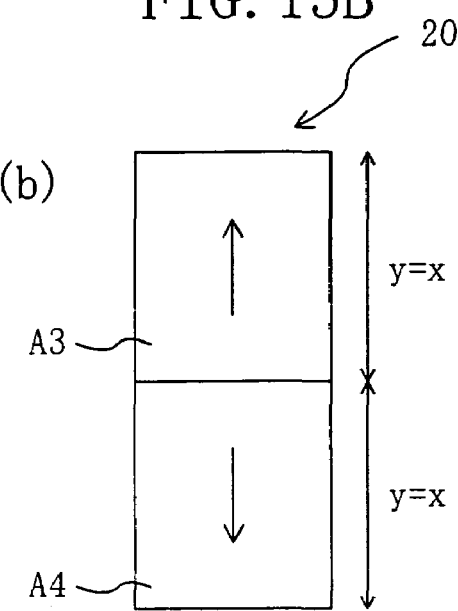
Figure 15C:
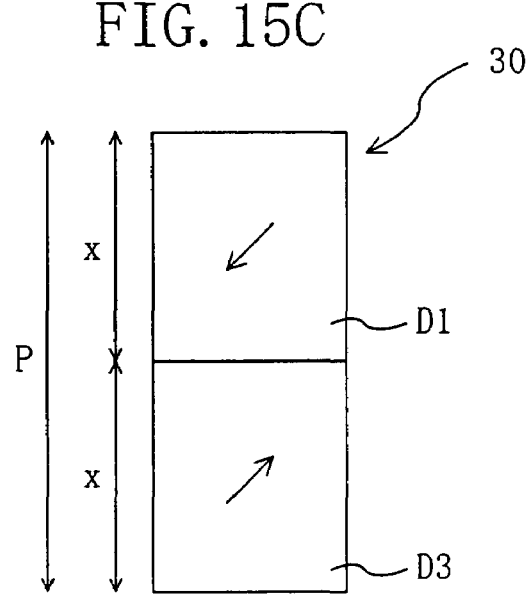

A liquid crystal display device was produced as in Example 1 except that a 2-divided domain was formed in each picture element as illustrated in FIG. 15A, FIG. 15B and FIG. 15C. Each picture element of this liquid crystal display device includes only a first sub-domain D1 and a third sub-domain D3. Thus, in contrast to the 4-divided domain D of the liquid crystal display device of Example 1 and that of Example 2, the first sub-domain D1 and the third sub-domain D3 are adjacent to each other with no second sub-domain D2 or fourth sub-domain D4 being formed in the picture element.

Figure 16:
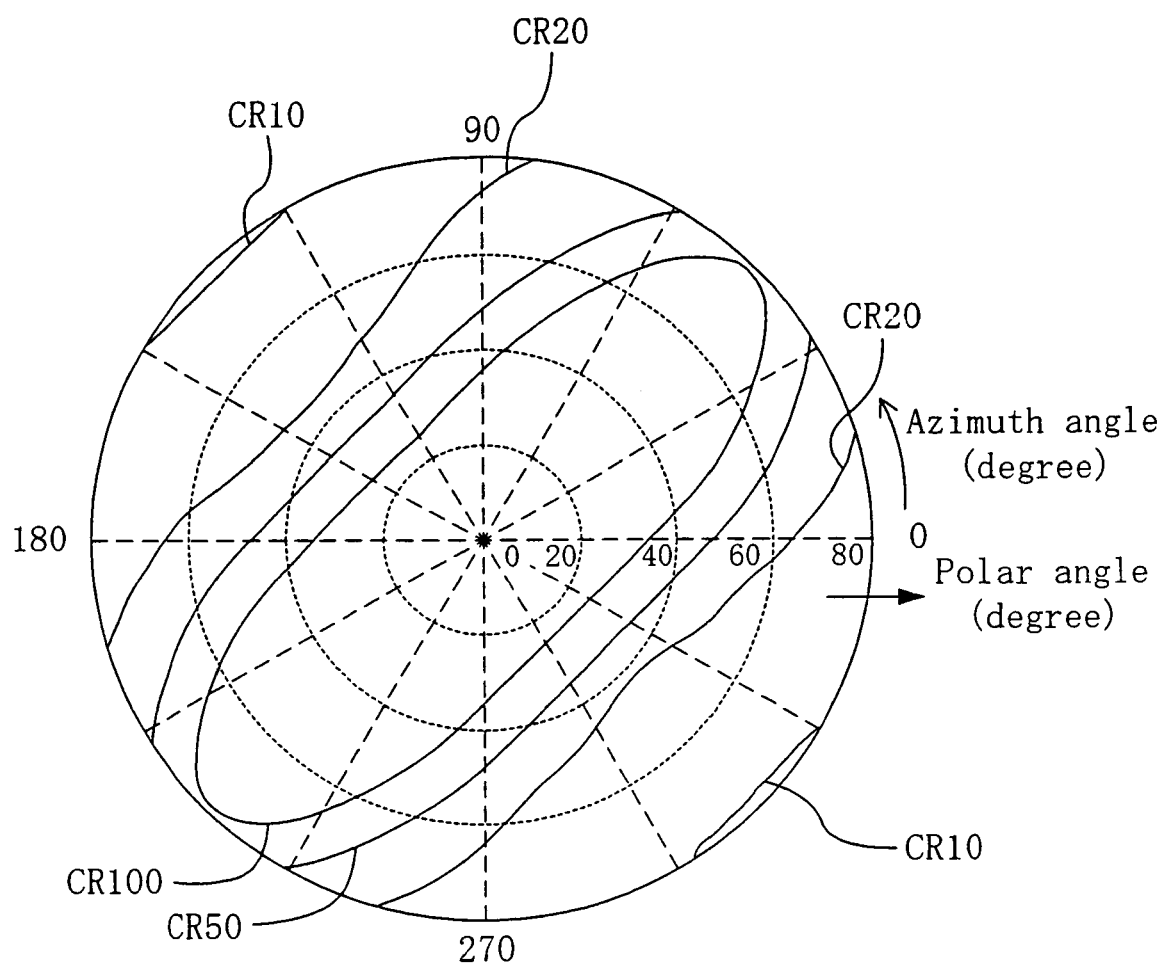
FIG. 16 is an iso-contrast contour illustrating a viewing angle characteristic of the liquid crystal display device of Comparative Example 1.

FIG. 16 illustrates the viewing angle characteristic (iso-contrast contour) of the obtained liquid crystal display device. As is apparent from a comparison between FIG. 16 and FIG. 8 and between FIG. 16 and FIG. 14, the liquid crystal display device of Comparative Example 1 has a poor viewing angle characteristic, i.e., the degree of azimuth angle dependence is greater and a desirable display can be realized only for a narrower range of viewing angles, as compared with the liquid crystal display devices of Examples 1 and 2. Moreover, the orientation of the liquid crystal molecules is less stable, and the occurrence of a disclination line between the first sub-domain D1 and the third sub-domain D3 was observed in some cases.

Moreover, a 90°-twist TN type liquid crystal display device with no orientation division was produced with substantially the same arrangement as that of the liquid crystal display device of Example 1, and the display characteristic thereof was evaluated. Note that a horizontal alignment film (e.g., AL4552) was used as the alignment film, and a nematic liquid crystal material having a positive dielectric anisotropy (e.g., MS90847) was used.

Although the obtained liquid crystal display device had the same response time Ts as that of the liquid crystal display device of Example 1, i.e., 16 msec, the degree of viewing angle dependence was great (particularly, the tint in a color display was greatly dependent on the viewing angle), and a desirable display was obtained only in a very narrow range of viewing angles.

COMPARATIVE EXAMPLE 2

Figure 17A:
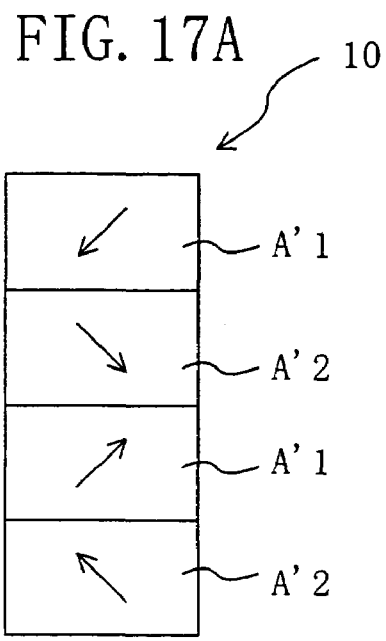
FIG. 17A, FIG. 17B and FIG. 17C are schematic diagrams illustrating an arrangement of a divided domain of a liquid crystal display device of Comparative Example 2.
Figure 17B:
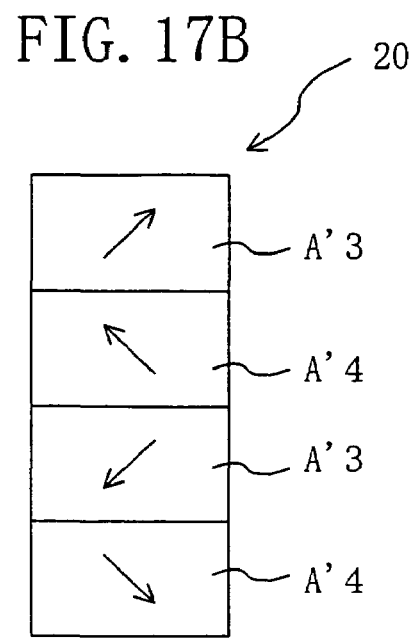
Figure 17C:
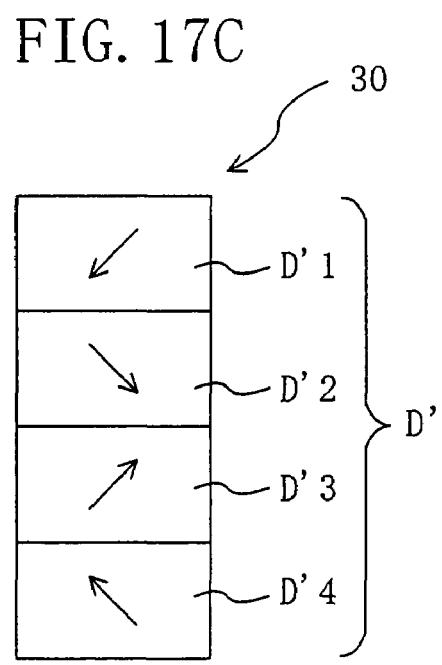

A liquid crystal display device of Comparative Example 2 was an ECB mode liquid crystal display device having a 4-divided domain, and was the same as the liquid crystal display device of Example 1 except that a 4-divided domain D' as illustrated in FIG. 17A, FIG. 17B and FIG. 17C was formed.

In contrast to the 4-divided domain D of Example 1 as illustrated in FIG. 2A, FIG. 2B and FIG. 2C, the 4-divided domain D' of the liquid crystal display device of Comparative Example 2 has four sub-domains D'1, D'2, D'3 and D'4 that are respectively formed by four orientation-regulating regions, which are formed on each substrate. Specifically, the boundaries between the four sub-domains D'1, D'2, D'3 and D'4 correspond respectively to the boundaries between the orientation-regulating regions formed on both substrates. As a result, the orientation of the liquid crystal molecules was unstable, and a disclination line occurred between the four sub-domains D'1, D'2, D'3 and D'4, thus deteriorating the display quality. Moreover, the response time Ts was about 25 msec, i.e., longer than that (16 msec) of the liquid crystal display devices of Examples 1 and 2, indicating that the liquid crystal display device of Comparative Example 2 was not suitable for a motion picture display.

Moreover, in the process of forming the 4-divided domain, it was necessary to perform a photolithography step for defining domain-forming regions (application of a photosensitive resin layer, exposure, development and stripping) twice for each substrate, whereby the production process was complicated and there was a possibility for the vertical alignment film to be damaged by the process.

As described above, the present invention provides a liquid crystal display device with a desirable viewing angle characteristic that is capable of displaying an image with a high quality, and a method for producing the same. The liquid crystal display device of the present invention, also having a desirable response characteristic, is capable of realizing a motion picture display with a high quality. The liquid crystal display device of the present invention can suitably be used as a liquid crystal display device for personal digital assistants, personal computers, word processors, amusement equipment, educational equipment, and television sets.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention that fall within the true spirit and scope of the invention.

The invention claimed is:

1. A liquid crystal display device, comprising:
a first substrate;
a second substrate;
a vertical alignment type liquid crystal layer provided between the first substrate and the second substrate;
voltage application means for applying a voltage across the liquid crystal layer;
a plurality of picture elements each including the liquid crystal layer whose orientation changes according to the voltage applied by the voltage application means,
wherein:
the liquid crystal layer in each of the plurality of picture elements includes, at least in a presence of an applied voltage, a 4-divided domain including a first sub-domain, a second sub-domain, a third sub-domain and a fourth sub-domain which are arranged in this order in a predetermined direction and in each of which an orientation direction of liquid crystal molecules located in a vicinity of a center of the liquid crystal layer in the thickness direction is different from those of the other sub-domains;
for each 4-divided domain, the first substrate includes two first regions each having an orientation-regulating force for orienting the liquid crystal molecules of the liquid crystal layer in a first direction and a second region provided between the two first regions and having an orientation-regulating force for orienting the liquid crystal molecules in a second direction that is opposite to the first direction, while the second substrate includes a third region having an orientation-regulating force for orienting the liquid crystal molecules in a third direction that crosses and is not parallel to the first direction and a fourth region having an orientation-regulating force for orienting the liquid crystal molecules in a fourth direction that is opposite to the third direction, and
each boundary between the sub-domains extends in a direction perpendicular to a direction that the sub-domains are arranged.

2. A liquid crystal display device, comprising:
a first substrate;
a second substrate;
a vertical alignment type liquid crystal layer provided between the first substrate and the second substrate;
voltage application means for applying a voltage across the liquid crystal layer;
a plurality of picture elements each including the liquid crystal layer whose orientation changes according to the voltage applied by the voltage application means,
wherein:
the liquid crystal layer in each of the plurality of picture elements includes, at least in a presence of an applied voltage, a 4-divided domain including a first sub-domain, a second sub-domain, a third sub-domain and a fourth sub-domain which are arranged in this order in a predetermined direction and in each of which an orientation direction of liquid crystal molecules located in a vicinity of a center of the liquid crystal layer in the thickness direction is different from those of the other sub-domains;
for each 4-divided domain, the first substrate includes two first regions each having an orientation-regulating force for orienting the liquid crystal molecules of the liquid crystal layer in a first direction and a second region provided between the two first regions and having an orientation-regulating force for orienting the liquid crystal molecules in a second direction that is opposite to the first direction, while the second substrate includes a third region having an orientation-regulating force for orienting the liquid crystal molecules in a third direction that crosses the first direction and a fourth region having an orientation-regulating force for orienting the liquid crystal molecules in a fourth direction that is opposite to the third direction,
each boundary between the sub-domains extends in a direction perpendicular to a direction that the sub-domains are arranged, and
wherein the first direction and the third direction are perpendicular to each other.

3. A liquid crystal display device, comprising:
a first substrate;
a second substrate;
a vertical alignment type liquid crystal layer provided between the first substrate and the second substrate;
voltage application means for applying a voltage across the liquid crystal layer;
a plurality of picture elements each including the liquid crystal layer whose orientation changes according to the voltage applied by the voltage application means,
wherein:
the liquid crystal layer in each of the plurality of picture elements includes, at least in a presence of an applied voltage, a 4-divided domain including a first sub-domain, a second sub-domain, a third sub-domain and a fourth sub-domain which are arranged in this order in a predetermined direction and in each of which an orientation direction of liquid crystal molecules located in a vicinity of a center of the liquid crystal layer in the thickness direction is different from those of the other sub-domains;
for each 4-divided domain, the first substrate includes two first regions each having an orientation-regulating force for orienting the liquid crystal molecules of the liquid crystal layer in a first direction and a second region provided between the two first regions and having an orientation-regulating force for orienting the liquid crystal molecules in a second direction that is opposite to the first direction, while the second substrate includes a third region having an orientation-regulating force for orienting the liquid crystal molecules in a third direction that crosses the first direction and a fourth region having an orientation-regulating force for orienting the liquid crystal molecules in a fourth direction that is opposite to the third direction,
each boundary between the sub-domains extends in a direction perpendicular to a direction that the sub-domains are arranged, and
wherein an angle between the first and second directions and the third and fourth directions is in a range of about 89 degrees to about 91 degrees.

* * * * *

UNITED STATES PATENT AND TRADEMARK OFFICE
CERTIFICATE OF CORRECTION

PATENT NO.      : 7,580,101 B2                         Page 1 of 1
APPLICATION NO. : 11/030284
DATED           : August 25, 2009
INVENTOR(S)     : Terashita et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 618 days.

Signed and Sealed this

Fourteenth Day of September, 2010

David J. Kappos
*Director of the United States Patent and Trademark Office*